United States Patent
Mayer

(10) Patent No.: US 7,727,646 B2
(45) Date of Patent: Jun. 1, 2010

(54) FUEL CELL AND METHOD FOR DEPLETING CARBON DIOXIDE

(76) Inventor: Günter Mayer, Freiligrathstrasse 48, 64319 Pfungstadt (DE)

( * ) Notice: Subject to any disclaimer, the term of this patent is extended or adjusted under 35 U.S.C. 154(b) by 580 days.

(21) Appl. No.: 11/816,469

(22) PCT Filed: Feb. 7, 2005

(86) PCT No.: PCT/DE2005/000204

§ 371 (c)(1),
(2), (4) Date: Aug. 16, 2007

(87) PCT Pub. No.: WO2005/078836

PCT Pub. Date: Aug. 25, 2005

(65) Prior Publication Data

US 2009/0186244 A1    Jul. 23, 2009

(30) Foreign Application Priority Data

Feb. 12, 2004  (DE) .................... 10 2004 006 915

(51) Int. Cl.
  H01M 8/06  (2006.01)
  H01M 8/02  (2006.01)
  H01M 8/04  (2006.01)
  H01M 8/14  (2006.01)
(52) U.S. Cl. ..................... 429/16; 429/17; 429/34; 429/2
(58) Field of Classification Search .......... 429/16
See application file for complete search history.

(56) References Cited

U.S. PATENT DOCUMENTS

| 3,847,672 A | | 11/1974 | Trocciola et al. | |
|---|---|---|---|---|
| 4,202,752 A | * | 5/1980 | Sherwood et al. | 204/222 |
| 4,643,955 A | | 2/1987 | Smith et al. | |
| 4,673,473 A | * | 6/1987 | Ang et al. | 205/441 |
| 4,943,496 A | | 7/1990 | Okada et al. | |
| 5,232,792 A | | 8/1993 | Reznikov | |
| 5,705,051 A | * | 1/1998 | Coin et al. | 205/770 |
| 6,322,916 B1 | | 11/2001 | Hemmes et al. | |
| 2005/0025682 A1 | * | 2/2005 | Essaki et al. | 422/190 |

FOREIGN PATENT DOCUMENTS

| DE | 689 01 782 T2 | | 12/1992 |
|---|---|---|---|
| DE | 199 36 087 A1 | | 2/2001 |
| JP | 7-45296 A | | 2/1995 |
| JP | 02000119878 | * | 4/2000 |
| WO | WO 98/08264 A2 | | 2/1998 |

* cited by examiner

Primary Examiner—Patrick Ryan
Assistant Examiner—Ladan Mohaddes
(74) Attorney, Agent, or Firm—Foley & Lardner LLP

(57) ABSTRACT

The invention concerns a fuel cell comprising an anode chamber, a cathode chamber and a cavity for the electrolytic space, as well as combustion gas supply conduits and carbon dioxide and water discharge conduits for the anode chamber, and, for the cathode chamber, oxygen and carbon dioxide supply conduits and discharge conduits for residual oxygen and residual carbon dioxide. The anode chamber and the cathode chamber receive a metal sponge, the cathode chamber housing a metal or ceramic sponge. Said fuel cell is subdivided into an anode chamber, an outer cathode chamber and a median cathode chamber, separate cavities for electrolytic space located between the anode chamber and the median cathode chamber and the median cathode chamber and the outer cathode chamber. An electrolyte conduit enters the median cathode chamber, the oxygen supply conduits and the oxygen discharge conduits are arranged on the median cathode chamber, and the $CO_2$ supply conduits and the $CO_2$ discharge conduits are located on the outer cathode chamber.

23 Claims, 13 Drawing Sheets

FUEL CELL AND METHOD FOR DEPLETING CARBON DIOXIDE

The present invention relates to a novel multi-chamber fuel cell, in which an electric current is produced using carbon dioxide and hydrogen in an alkaline melt ($LiKCO_3$). The gases are passed through anodes and cathodes, with the gases making contact with the melt at the boundary surfaces, and with them producing an electron flow.

WO 98/08264 proposes the carbon dioxide be introduced into the carbonate matrix at a distance from the cathode, into a multichamber fuel cell, with an electrolyte melt chamber being arranged between the anode chamber and the cathode chamber. However, this results in cell stability problems and leaks associated with them, since the gas carries out mechanical work in the melt, and the pressure differences in the anode chamber and the cathode chamber transmit forces to the chamber within the electrolyte. Furthermore, the flow cross section and thus the distance between the two inner walls within the electrolyte cannot be varied indefinitely, in order to ensure a smooth process.

The expectations of electrolyte matrices are that they are structurally stable and can be produced in very thin plates in order that the impedance in the subsequent cell is as low as possible. Furthermore, it should be possible to produce them at very low cost. One precondition for being able to produce them at low cost is, inter alia, that they can be drawn as a film out of an aqueous-dispersible mass. Nowadays, electrolyte matrices are composed of ceramic, such as aluminum oxide or a mixture of aluminum oxide and zirconium oxide. The electrolyte matrix is loaded from both sides by a high surface pressure, thus providing the contact between the electrode and the electrolyte. It is known for isolated cracks to occur, particularly when the cell has been in operation for a relatively long time. DE 199 36 087 A1 therefore proposes that the electrolyte matrix have crack-stopping additives mixed with it. These are composed of FeCrAl particles which are surrounded, by prior oxidation, with an electrically insulating $AlO_2$ layer and can therefore be processed in an aqueous dispersion.

U.S. Pat. No. 4,643,955 discloses a fuel cell which comprises a porous anode and a porous cathode which are separated from one another by an electrolyte matrix. The problem of the cathode, which is preferably composed of nickel oxide, being chemically dissolved is solved in this case by possible leaks in the electrolyte matrix being prevented by means of a second electrolyte layer by drawing in a further porous metal layer, impregnated with electrolyte, between the anode chamber and the electrolyte matrix, and by inserting a porous metallic layer between the cathode and the electrolyte matrix, with this metallic layer not being impregnated with electrolyte, and providing drainage. The anode and cathode are designed to have a pore width of more than 5 µm, and those layers which are arranged closest to the electrolyte matrix are designed to have a pore width of less than 1 µm, in contrast to the anode and cathode further away from the electrolyte matrix. The hydrogen which still diffuses through the electrolyte matrix is oxidized by the oxygen to form water. The layer which is designed to be a drainage has a pore width of less than 1 µm, so that the oxidation through the rest of the mass flow is not impeded. This measure results in reduced reduction of nickel ions to elementary nickel in the electrolyte matrix, in comparison to a fuel cell without such a protective apparatus.

In order to lengthen the life and in order to reduce short circuits in the electrolyte matrix caused by nickel ions which are reduced to elementary nickel by diffused hydrogen from the anode chamber, Japanese Application JP 07045296 A proposes that the cell be produced from 3 porous layers as well as a perforated metal plate composed of nickel. The central porous layer is impregnated with electrolyte compound and forms the electrolyte matrix. The gas-permeable anode is adjacent to one side, and the gas-permeable cathode is adjacent to the other side, with a perforated nickel plate being inserted close to the electrolyte matrix in the cathode, and with the gas-permeable cathode layer between the electrolyte matrix and the nickel plate being used as drainage for the oxidized hydrogen. The hydrogen passing through the electrolyte matrix is oxidized by the oxygen there to form water, while the oxygen/carbon-dioxide gas mixture flowing through the cathode chamber above the drainage is not involved in the oxidation process.

The material most widely used for production of electrodes to date is nickel. The main problem with electrodes composed of nickel and nickel alloys is, however, still the structural instability. Over the course of time, the electrodes may be plastically deformed during operation, or may be sintered during short-term use, so that the specific surface extent of a porous electrode is reduced and the contact pressure on the electrolyte matrix decreases, as a result of which the cell loses power. DE 689 01 782 T2 proposes that the porous electrode be mixed with ceramic particles uniformly distributed in it, with the ceramic particles being covered with a thin layer of lanthanum. The ceramic particles prevent the nickel grains from being sintered to one another.

BRIEF DESCRIPTION OF THE DRAWINGS

FIG. 4 shows, schematically, the half capacitor in the form of an exploded illustration.

FIG. 5 shows, schematically, the design of an anode chamber and cathode chamber, which have been further developed in comparison to a metal sponge, in the form of an exploded drawing.

FIG. 6 shows, schematically, a module plate which contains the cathode chamber (7) and the electrolyte matrix (6) surrounding the cathode chamber, with the cathode chamber having a large number of channels.

FIG. 7 shows, schematically, the composition of a complete fuel cell with the components according to the embodiment descriptions relating to FIGS. 4 to 6, as an exploded drawing.

FIG. 8 shows a cylindrical cell stack which, in its interior, comprises four cells and forms a cell block by means of three-dimensional fittings.

FIG. 9 shows the fuel cell ready to operate, housed in a cylindrical casing, with a cup spring fitted.

DETAILED DESCRIPTION OF THE INVENTION

Figure 1:
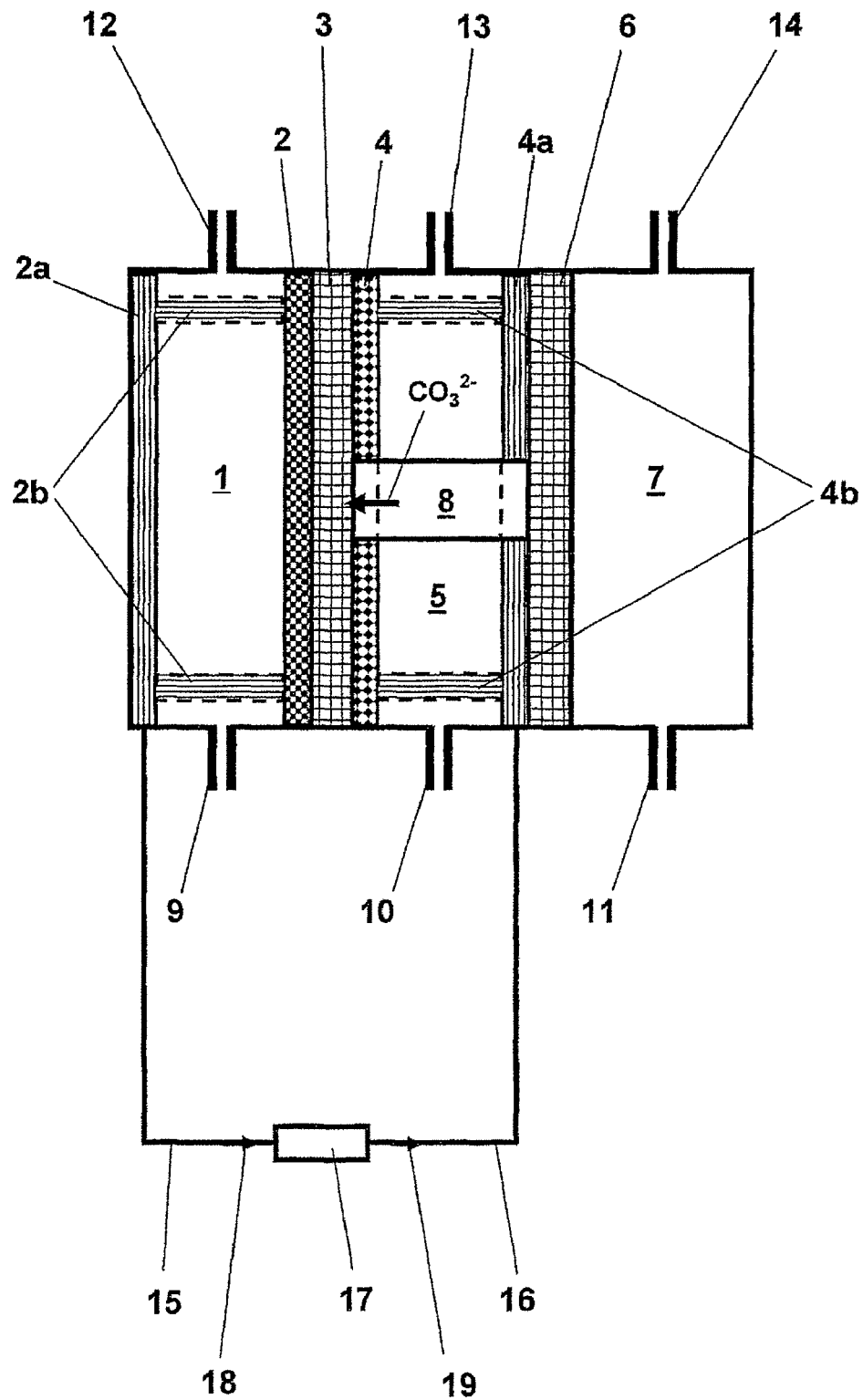
FIG. 1 shows an embodiment of a fuel cell according to the invention.

The present invention is based on the object of providing a fuel cell which is considerably more stable than the prior art, has no leaks and allows a wide flow cross-sectional area. Furthermore, it should also be possible to operate the cell with a mixed gas composed of $CO_2$ and other, for example, combustible gases, as is precluded not only by the fuel cells described in WO 98/08264 but also by all other fuel cells known to date.

As claimed in the main claim 1, this object is achieved by a fuel cell having an anode chamber, a cathode chamber and electrolyte area as well as supply lines for fuel gas ($H_2$ and/or CO) and output lines for the carbon dioxide and water that are produced on the anode chamber, and supply lines for oxygen and carbon dioxide as well as output lines for residual oxygen and residual carbon dioxide on the cathode chamber, with the anode chamber and the cathode chamber holding a profiled body or a metal sponge with wide pores, according to the invention, in that the fuel cell is subdivided into an outer cathode chamber and a central cathode chamber, and two separate electrolyte areas are arranged between the anode chamber and the central cathode chamber, as well as the outer cathode chamber. An electrolyte channel passes through the central cathode chamber, and the supply line and the output line for $CO_2$ are arranged on the outer cathode chamber.

The metal sponge in the outer cathode chamber through which carbon dioxide flows can be replaced by a ceramic sponge without detracting from the method of operation of the ion-forming process in the adjacent electrolyte. The use of a sponge such as this solves a general life problem in that the sponge-like cathode chamber, which is normally composed of nickel oxide, can no longer react chemically, thus resulting in it having a virtually unlimited life. Only the reaction area of the electrolyte therefore remains for particularly aggressive gases which are added to the carbon dioxide, limiting its life.

The newly provided capability for combustible gases also to be passed through the outer cathode chamber in addition to carbon dioxide in the end has the advantage that it is possible to resupply all of the fuel gas leakage from the anode chamber. As is known, fuel cells have a fuel gas leakage of between 15 and 30%. Until now, it has been possible to make use of this leakage within the fuel cell system only by converting it catalytically to thermal energy with the aid of oxygen. When it is fed back completely, virtually 100% of the fuel gas can therefore be converted to electrical energy, and there is no need for catalytic conversion of the fuel gas leakage.

Since the gases, in particular those supplied to the anode chambers, are not converted completely during the electricity generation process, it is proposed that they partially be circulated in a manner known per se, with fresh gas being added.

In this case, it is impossible to reduce the carbonate ion since it is driven in the direction of the anode as a result of the potential difference between the anode and the cathode, and leaves a flaw on the electrolyte boundary surface into which only a new $CO_2$ molecule can be forced back from the cathode chamber.

This principle can therefore also be used for selective depletion of carbon dioxide from other gas flows, in particular combustible gas flows such as processed gas, biogas, methane or natural gas. According to the invention, as claimed in claim 14, combustible gases such as natural gas can be depleted of the carbon dioxide contained in them.

A further particular advantage of the fuel cell according to the invention can be seen in that the outer cathode chamber can be supplied with any desired gas mixtures containing $CO_2$, since these need not be introduced into the carbonate melt and are therefore also not oxidized. This makes it possible, for example, to purify exhaust gases from biogas reactors of $CO_2$ components with electricity being generated, with sterility being maintained when reactors such as these from the pharmaceutical industry are connected, and with purified air oxygen emerging at the output, which can be fed back to the reactor.

The principle of operation of the fuel cell is as follows: carbon dioxide ($CO_2$) is absorbed by the electrolyte melt at the outer and/or central cathode. At the same time, oxygen is reduced at the central cathode and is converted with the carbon dioxide ($CO_2$) dissolved in the electrolyte melt to form carbonate ions ($CO_3^{2-}$). These then flow in the direction of the anode. The anode is supplied with hydrogen ($H_2$) as fuel gas on its own, in conjunction with carbon monoxide (CO) or just with CO, with the hydrogen being oxidized to form water ($H_2O$), and the carbon monoxide being oxidized to form carbon dioxide ($CO_2$), and carbon dioxide ($CO_2$) being converted as cracked gas with the carbonate ions ($CO_3^{2-}$) from the melt. The carbon dioxide is fed back from the anode to the outer and/or central cathode in a circuit.

The reactions are as follows:

Cathode reaction $\frac{1}{2}O_2 + CO_2 + 2e^- \rightarrow CO_3^{2-}$

Electrolyte Cathode $\rightarrow CO_3^{2-} \rightarrow$ anode

Anode Reactions:

a) in the absence of CO $H_2 + CO_3^{2-} \rightarrow CO_2 + H_2O + 2e^-$ b) in the presence of CO $H_2 + CO + 2CO_3^{2-} \rightarrow 3CO_2 + H_2O + 4e^-$ c) in the absence of $H_2$ $CO + CO_3^{2-} \rightarrow 2CO_2 + 2e^-$ The electrolyte matrix is subject to particularly stringent requirements. One particular requirement for the fuel cell and in particular for the anode chamber and cathode chamber as well as the electrolyte matrix is represented, inter alia, by temperature changes, the temperature distribution and the pressure load resulting from the pressure of the anode chamber and cathode chamber on the electrolyte matrix. Temperature changes cause distortion, and in the worst case lead to crack formation and to leaks. The temperature distribution in the chambers can lead to sintering, thus reducing the contact pressure against the electrolyte matrix, with the cell losing power. Furthermore, a temperature profile is formed with a temperature difference between the inlet and the outlet of the individual chambers, resulting from the flow rate of the individual gas flow, with the speed-dependent flow resistance in the chambers through which the flow passes being governed by the pore width in the metal sponges of the anode chamber and cathode chamber.

According to the present prior art, the aspects of the problem cannot all be solved at the same time. There is therefore a need for a novel, universal solution. According to the invention, the object is achieved in three step elements, in such a manner that a) the electrolyte matrix together with the anode chamber and the central cathode chamber forms a half capacitor and is in the form of an ion-conducting layer body, with the cathode electrode being used as a capacitor plate and the anode electrode being used as a current output plate for an external capacitor plate, b) the current collectors in the anode chamber and cathode chamber are connected via a spring, reducing the pressure, to the anode electrode and the cathode electrode, and the metal sponges in the anode chamber and the cathode chamber are replaced by more open bodies with less flow resistance in order to improve the cooling, and c) the surface forces which act from the outside on the anode chamber and cathode chamber are absorbed by bodies which surround the anode chamber and the cathode chamber with the associated inlets and outlets, forming a seal, thus relieving the load of the applied contact pressure from the anode and cathode chambers, as well as the half capacitor.

The prior art will first of all be described in the following text, in order to illustrate the advantages of the half capacitor in comparison to a conventional electrolyte matrix.

The carbonate ions ($CO_3^{2-}$) generated in the cathode chamber and received by the electrolyte flow from the cathode to the anode therein, by being driven by means of a charge difference between the anode and the cathode. A charge difference such as this exists between the electrode plates of a capacitor.

The capacitors used in fuel cells are in the form of plate capacitors, such that they comprise an anode and a cathode electrode as well as an electrolyte which acts as a dielectric, with the electrolyte being located in a housing, the electrolyte matrix, separating the two electrodes from one another. The electrolyte results in a polarization charge on both sides and allows some of the field lines to end there, as a result of which the electrical field strength decreases, and an effect which reinforces the charge occurs.

The capacitance of a capacitor is also governed by the surface which receives the electrons. This surface must be gas-permeable, for which reason porous metal sponges are used. The increase in surface area in comparison to a film solution is considerable, although the grain size of the metal beads must not be chosen to be too small. There are two reasons for this. As the grain size becomes smaller, the pore width of the metal sponge shrinks, thus increasing the flow resistance in the electrode and increasing the drive power required for the gas to be transported. At the same time, the capillary forces in the metal sponge increase as a result of the pore width becoming narrower, drawing the electrolyte out of the electrolyte matrix, as a result of which the electrode becomes filled with electrolyte, leading to dilution of the electrolyte in the electrolyte matrix and, in the end, to an interruption in the ionic connection between the two electrodes. For this reason, a grain size of between about 3 µm and 10 µm is preferable for the metal sponge, and about 0.3 to <1 µm for the electrolyte matrix. The increase in the surface area to receive the electrons is therefore limited by purely practical considerations. For this reason, the electrode must be subjected to a so-called activation process, in which the surface area is retrospectively enlarged by nanopores.

Finally, the ionic connection can be produced between the electrolyte matrix and the electrode on the two sides. Since the electrolyte matrix has a very narrow pore width and the electrode has a relatively wide pore width, and the electrolyte does not project out of the electrolyte matrix in the form of an outward bulge, but is recessed in it, the metal sponge must be pressed against it with high pressure. There is therefore also another aspect in which contact is made between the metal sponge and the electrolyte matrix pores, which are filled with electrolyte. In order to make contact at all despite high contact pressures, the grain size must not differ excessively between the electrolyte matrix and the metal sponge in order to ensure that the metallic contact pressure makes a connection between the electrolyte and the metal sponge. The connection to the electrolyte in the pore space of the electrolyte matrix is made by deformation of the metal bead in this way. However, the high contact pressure is also transported to the rest of the metal sponge and results in the pore spaces therein being narrowed. In some cases, this can lead to the elasticity limit being exceeded. The deformation continues as soon as the electrode approaches its warm state during operation, and the contact forces are increased further by the thermal expansion of the metal sponge.

There is therefore a requirement for a solution which decreases the high contact forces on the electrolyte matrix and on the porous anode and cathode electrodes. According to the invention, the stated object is achieved as claimed in claim 4 in that electrodes are fitted to both sides of the electrolyte matrix and are ionically connected to one another via the electrolyte introduced into the electrolyte matrix. The electrodes are also part of the three-phase boundaries between "solid/liquid/gaseous" at which the ionization and discharge processes take place. The carbonate ions are driven by the charge difference between the capacitor plate on the cathode side and a capacitor plate which rests on the outside of the anode electrode.

The core of the fuel cell therefore comprises a half capacitor with a capacitor plate on the cathode side in the form of an ionically conductive layer body, as well as a separate capacitor plate on the anode side. The half capacitor is composed of a total of three layers, comprising a porous electrolyte matrix, for example composed of aluminum oxide, zirconium oxide or a mixture of the two, a porous sintered cathode electrode composed of nickel oxide as the cathode capacitor plate and cathode electrode, an anode electrode and an electrolyte which passes through the cathode electrode and the ceramic plate. The anode electrode is in the form of a nickel layer which, for example, is applied to the ceramic by vapor-deposition or sputtering.

The electrolyte matrix has a wall thickness of preferably 50 µm to 100 µm, and a porosity of between 30 and 60%. The cathode electrode is composed of nickel oxide, and has a layer height of preferably 1500 µm to 2000 µm, and the anode electrode has a thickness of about 1 µm to 5 µm.

According to the invention as claimed in claim 23, the electrolyte matrix is subjected to an overpressure on the cathode side, and to a reduced pressure on the anode side while the anode electrode is being coated. The overpressure on the cathode side results in a gas being introduced into the electrolyte matrix, which is still unfilled, and emerging from the anode side. The gas results in the metal vapor not being precipitated in the pore inlets during the vapor deposition and sputtering, and closing the pores on the anode side. The coating process is ended at the latest as soon as the pore inlets start to constrict. This can be identified, for example, by an increase in the reduced pressure on the anode side.

Depending on the method used, use is made of the process gas that is most suitable for this purpose. When using the vapor-deposition method for coating, for example, this is the hydrogen or the carbon monoxide, while in fact only argon can be used as the process gas for a sputtering method.

Purging the electrolyte matrix with process gas has the advantage that the pore inlets on the anode side are admittedly constricted somewhat, but they do not close completely. The growth of the pore inlets results in the capillary forces in the pore space increasing further, resulting in the indentation of the electrolyte therein disappearing, with an outward bulge being developed instead. The outward bulge makes it possible for the electrolyte to be connected to the anode electrode. At the same time, the pores are opened, so that the cracked gases carbon dioxide and oxygen can leave the electrolyte without impediment when the carbonate ions are electrically discharged, without carrying out mechanical work in the electrolyte.

Once the anode film has been fitted as the film according to the prior art, the cathode electrode is drawn onto the porous ceramic plate, is air-dried, has organic binding agents removed from it in a heating process, and is then sintered and oxidized in an oxygen atmosphere. For this purpose, the nickel powder is processed with a binding agent, softener etc. in advance to form a pasty compound, with air being extracted in a vacuum.

The nickel oxide layer has a mean grain size of preferably 0.3 µm. This grain size results in a sufficiently large opposing electrode for the anode even with a thickness of 2 mm, without having to activate the film layer. The chosen grain size has the advantage that large capillary forces occur within the film, and these are sufficient to hold the electrolyte to be held therein in the long term, with the electrolyte passing through the cathode electrode, as a dielectric, increasing its charge.

According to the prior art, the electrolyte matrix is filled with electrolyte by preferably introducing the electrolyte at the point which is intended for connection of the electrolyte channel and from which cathode material has been removed.

All that is now required to produce the full function between the cathode and the anode electrodes is the capacitor plate on the anode side. This is preferably composed of a nickel sponge, and it is connected to the anode electrode by contact pressure. This is produced in the same way as the cathode electrode, with the exception that the sintering process is carried out in a hydrogen atmosphere, with the mean grain size preferably being about 3 µm to 5 µm, with the layer thickness being about 5 mm. This process is preferably carried out after the fuel cell has been assembled. This means that the blank, which can still be shaped, can be better matched to the anode electrode, overcoming any possible uneven areas and dimensional tolerances.

The half capacitor, which is composed of three layers, provides good current transition points on the anode side and cathode side by means of electrode connections with which contact can be made directly and which do not sinter. Since the individual electrode can be connected to the current collector in a highly conductive form with little contact pressure, the mechanical load decreases, to be precise both on the electrode and on the electrolyte matrix. This overcomes the problems, which have been known until now, of creepage on the electrode and that of crack formation on the electrolyte matrix, resulting from an excessive mechanical and thermal load. The adhesive bonding of the cathode electrode and electrolyte matrix by means of the electrolyte not only increases the stability of the electrolyte matrix overall, but also that of the cathode electrode, thus also overcoming the problem of deformation in the event of severe temperature and load fluctuations. At the same time, the adhesive bonding between the cathode electrode and the electrolyte matrix means that, if any cracks are formed therein, the surrounding electrolyte, which is forced back into the crack from the cathode electrode, itself fills the crack. This allows the wall thickness of the electrolyte matrix to be reduced further to a value which is not possible for robustness reasons in the case of a conventional design. The resultant decrease in the distance between the anode and cathode has two advantages for transportation of the carbonate ions, specifically a) that the capacitance between the anode and the cathode is increased by the reduction in the distance between the two applied electrodes, thus increasing the drive for the carbonate ions in the melt, and b) the carbonate ions travel over a shorter distance from the cathode to the anode. Both changes a) and b) lead to a decrease in the impedance between the anode and the cathode in comparison to a conventional electrolyte matrix.

According to the invention, the cooling of the anode chamber and of the cathode chamber, and the reduction in the flow resistance, are achieved, as claimed in claim 5, with wide openings.

Steel and aluminum are preferably used as materials. The open body is closed by a gas-permeable wall on the side facing the electrode, and by a current collector opposite. The open bodies are, for example, fitted to the anode and cathode electrodes by spring pressure. In one advantageous embodiment of an open body, profiles and open-pore metal sponges are formed, and, for example, these can be produced using an injection-molding technique.

The profiled body is preferably composed of individual metal sheets folded to form open triangles whose tips, for example, lie on the gas-permeable wall and whose third limb side is cut through centrally, with the elements being bent outwards, in the form of two limb halves, until they rest on the current collector, as a current transmission and spring metal sheet. The metal sheets and in particular the wall adjacent to the electrode, which comes into contact with the electrolyte, are, for example, electrochemically nickel-plated or chromium-plated, if they can corrode.

Profiled bodies can be produced easily and at low cost, and are highly suitable for mass production. The profiled parts that are placed on edge on the gas-permeable wall mean that only a small number of openings in the wall are covered by the profiled body, with the majority of the electrode area remaining free for the gas to flow in and out. This has the advantage that the three-phase boundaries between the electrode, melt and chamber carrying the gas is maintained. The profiled body can also be designed such that, for example, a plurality of profiles engage in one another like a comb, thus reducing the distances between the contact surfaces and leading to the forces being distributed more uniformly over the gas-permeable wall.

A further advantageous embodiment is represented by open-pore metal sponges, composed of steel or aluminum by way of example, which, according to the prior art, are produced by injection molding. These have the advantage that they can be produced more cheaply and in a shorter time in comparison to profiling.

The reduction in the contact forces which are applied over an area to the anode and cathode chambers as well as the electrolyte matrix and/or half capacitor is achieved according to the invention, as claimed in claim 6, by bodies which surround the anode and cathode chambers, drawing and adsorbing onto them the forces which occur over an area.

The solution is achieved by a cylindrical ring surrounding the anode and cathode chambers. By way of example, the cylindrical ring is composed of steel, aluminum or a ceramic, preferably of a ceramic, and particularly preferably of aluminum oxide or zirconium oxide.

The cylindrical ring is firmly connected to the half capacitor on its outer annular surface, and its height is of such a magnitude that the open anode and cathode bodies incorporated in it, with their current collectors, are no higher than the upper edge of the cylinder. The cylinder is closed by a cover. The force which acts on the cover surface from the outside is transmitted from it to the wall of the cylindrical ring located underneath, where it is adsorbed.

In one particularly advantageous refinement, the cylindrical ring is produced by aluminum oxide. By way of example, the cylindrical body according to the prior art is burnt as ceramic or, according to the prior art, is produced from a casting compound to which binding agents have been added.

Casting compounds of this type are available, for example, as a powder with binding agents with the type designation RTC-60/70 as a two-component system from the Polytec Company. The mixture ratio between the powder and the binding agent on the one hand and the water on the other hand is 100:10 to 100:20, and preferably 100:14. The two-component casting compound is introduced into a mold, in which it is chemically cured. The degree of hardness can be increased by subjecting the molding to a temperature from above 600° C. to 1200° C. in an oven. The cured cylindrical ring can subsequently be mechanically machined, which is not possible, for example, with a burnt ceramic, so that discrepancies resulting from the shrinkage process cannot then be corrected. It is likewise possible to transfer the casting technique to further components for the fuel cell.

According to the invention and as claimed in claim 6, the connection between the cylindrical ring and the half capacitor on the one hand and the cover on the other hand is made by means of an adhesive, preferably by means of a ceramic high-temperature adhesive, for example based on zirconium oxide, mica, alumina silicates or aluminum oxide, such as those which are available from the Polytec Company. These substances are, for example, mixed with water, or are mixed before application. In addition, the adhesive technique should not be restricted to the cylindrical rings, but can be transferred to further components of the fuel cell.

The adhesive bonding process has the advantage that the bodies are firmly connected to one another and are sealed, and preferably have the same coefficients of expansion as the bodies to be adhesively bonded. This has the advantage that no thermally induced stresses occur within the adhesive-bonding point.

The central cathode chamber is closed by an electrolyte matrix which separates the central cathode chamber from the outer cathode chamber.

According to the prior art, this is normally done using a large amount of heat and a high pressure, by adhesive bonding to the melt electrolyte in the electrolyte matrix. However, pressure adhesion requires very high forces to be applied and maintained, which are transmitted through the force contact to the central cathode chamber and the anode chamber. In the cylindrical rings which surround the anode chamber and the central cathode chamber, this leads to all of the forces from the pressure being concentrated in the annular surfaces, and having to be adsorbed by them. However, the concentration on the annular surfaces leads to an extraordinarily high load, which can lead to fracture. There is therefore a need for a solution to reduce the forces in a sustained manner.

According to the invention, this object is achieved as claimed in claim 7 in that the electrolyte area in the electrolyte matrix surrounds the outer cathode chamber and the body of the electrolyte matrix closes the central cathode chamber.

Channels for the gas which contains carbon dioxide pass through the electrolyte matrix. An embodiment such as this has the advantage that the electrolyte matrix and the cathode chamber, which comprises individual channels, are combined to form a honeycomb-like module plate that is impregnated thoroughly with electrolyte. The walls surrounding the channels together with the pores that are filled with electrolyte form a large reaction area with the gas that contains carbon dioxide. The electrolyte matrix is produced as a porous ceramic plate, preferably from aluminum oxide, and is manufactured with dimensions such that the channels located in it oppose the substance flow with as little flow resistance as possible, at the same time allowing it to flow through at a high flow rate. The reduced flow resistance results in less energy being required for the gas flow. At the same time, the gas flow rate can be correspondingly increased, and the electrolyte matrix cooled, with a lower carbon-dioxide concentration. Finally, the proposed aluminum oxide has the advantage that it is very largely resistant to abrasive substances, such as those in flue gases from coal-fired power stations.

The surface of the module plate closes the central cathode chamber by connecting it by means of a high-temperature adhesive to the annular surface of the cylindrical ring of the central cathode chamber. The adhesive bonding results in a permanent join, so that there is no need for further pressure.

Before the module plate closes the central cathode chamber, the passage of the electrolyte through the central cathode chamber is prepared. According to the invention, the electrolyte passes through the central cathode chamber, as claimed in claim 8, in that the two electrolyte matrices are connected to one another by means of at least one channel that is filled with electrolyte. A passage such as this may comprise, for example, a hollow cylinder whose ends are adhesively bonded to the two electrolyte matrices, and whose interior is filled with electrolyte compound.

The electrolyte matrix in the half capacitor is for this purpose released from the electrode surface at the point at which the adhesive bonding and the connection of the passage and of the cylindrical ring that surrounds the central cathode chamber are made.

The exposed point for the passage is located, for example, in the center of the half capacitor and, for example, is in the form of a circular surface. A ceramic hollow cylinder is adhesively bonded with the aid of an adhesive to this surface, and is then filled with electrolyte compound. It is also possible to provide further passages at the edge of the central cathode chamber. For this purpose, for example, the cylindrical ring that surrounds the cathode chamber is provided with pockets through it, which are filled with electrolyte. The annular surfaces of the cylindrical ring are connected by means of an adhesive to the outer edge of the half capacitor. As soon as both, that is to say the passage and the ring, are firmly connected to the ceramic surface, the central cathode chamber is closed by the module plate with the aid of an adhesive.

The volume of the passage is designed such that, in addition to its basic function, it is also used as repository for both electrolyte matrices. The passage is preferably filled through the module plate. For this purpose, a filling opening passes through the module plate and is connected to the hollow cylinder and the possible pockets in the cylindrical ring. After the filling process, the filling opening is closed by a ceramic compound.

If two or more cells are connected in series, by stacking them on top of the other, then the anode chamber of the first cell is closed by a blank plate, and the second and each subsequent anode chambers are closed by a module plate.

The current collector in the anode electrode and cathode electrode is connected via an electrical conductor to an electrical load. A connection must be provided for this purpose, by means of which a permanently low contact can be made with the current collector. In order to ensure that the adhesion-bonding points installed in the cell are not excessively loaded, the contact between the contact and current collector must be made without a high contact force. Furthermore, a connection must be provided through which the cells can be connected in series with one another by the shortest route.

According to the invention, this object is achieved as claimed in claim 9 by contact pins which pass through the cover of the anode chamber and of the central cathode chamber.

The contact pins are inserted into specifically provided openings in the blank plate and in the module plate, and are adhesively bonded in a gastight manner using a high-temperature adhesive. The contact pin lengths are designed such that they extend into the anode chamber and the cathode chamber and exert a pressure on the current collectors to produce the contact between the contact pin and the current collector.

The contact pins are preferably composed of chromium-plated steel and are preferably coated with aluminum at their contact point opposite the current collectors. The contact is therefore made permanently not only by the contact pressure but at the same time also by metallic adhesion. The adhesion is produced by heating the contact pin until the aluminum layer melts. The adhesion has the advantage that the contact is not disadvantageously changed by corrosion of the surface, and the adhesive bond compensates for changes in the extent. This therefore ensures that the contact is made over the entire area even with a low contact pressure, while ensuring that the mechanical joints that are made are not subject to any excessive compressive stress.

Since the contact pins extend into the anode chamber and the central cathode chamber, this results in a direct connection between the central cathode electrode in the first cell and the anode electrode in the second cell, and vice versa, while the positive pole of the cell stack is produced by the contact pin from the anode chamber of the first cell, and the negative pole of the cell stack is produced by the contact pin from the cathode chamber of the second cell, for an external load.

According to the invention and as claimed in claim 10, spaces are fitted to the cell and cells both around the individual cell and around the cells that have been stacked to form a stack, through which spaces the inlets and outlets of the cell and of the cell stack are connected to the supply lines and the output lines.

The cells are preferably cylindrical, so that the cell stack forms a cylinder which preferably starts with one isolator plate, and likewise ends with another. The inlets and the outlets of the anode, of the central cathode and of the outer cathode chambers each enter and emerge from the cylinder circumference at 60° to one another. The inlets and the outlets of the cells are connected in parallel to one another around the cell stack in the axial direction, such that they form joint supply lines and output lines for the cells.

According to the invention and as claimed in claim 11, partitions are fitted, in one advantageous embodiment, to the circumference of the cell stack in the axial direction between the inlets and the outlets of the cells. The cell stack together with the partitions is positioned on a base plate, the spaces between the individual partitions are bridged by shell bodies, and the head area is closed by the cover plate, in which the inlets and outlets of the common lines are located. The partitions, the shell bodies and the base plate and cover plate are produced, for example, from a casting composed of aluminum oxide. The individual components are also advantageously connected to one another, and are then adhesively bonded, using a joining technique. Fixing rods are located at the end of the partitions in the axial direction on the outer circumference of the joint lines that are created, act on the partitions and the shell bodies, and hold the shell bodies firmly on the partitions. They are fixed by means of contact pressure which is applied by tightening strips, preferably composed of steel, gripping the fixing rods, which are preferably composed of aluminum or steel. The resultant cylindrical body forms a cell block that is ready for use.

Diffusors are preferably fitted in the common supply lines. These have a perforation which preferably points in the direction of the shell body wall and on which the substance flow is reflected towards the inlets of the cells. This has the advantage that the substance flow is made uniform over the entire cell stack, even when the flow rate is relatively high. Furthermore, the higher flow rate results in the cells being cooled more effectively, thus allowing the cells to be operated at a higher inlet temperature.

The cell block continuously emits heat to the surrounding area via the surface at its outer wall. Owing to the large temperature gradient between the interior and exterior, the cell block is additionally protected against uncontrolled draughts, and is cooled, in order to avoid undesirable stresses in the outer wall.

According to the invention and as claimed in claim 12, protection against draughts is achieved by the cell block being housed in a metal cylinder with an opening for the cooling medium to be supplied and carried away. The metal cylinder is closed on one side by a base plate, and on the other side by a cover plate. Two guide rails are included in the metal cylinder, and the fixing rods for the cell block are seated on them. In order to ensure that the tightening strips that surround the cell block do not impede the fixing rods from resting on the guide rails, and to ensure that the tightening strips remain hanging thereon, track grooves are incorporated in the fixing rods, in which the tightening strips rest, at a distance from the guide rails.

External cooling is preferably provided for the cell block by means of air flowing over it. By way of example, the amount of fresh air is adjusted such that the surface of the cell block can still be touched by hand. This has the advantage that the tightening strips are not subject to any excess thermal loading and need not be tightened excessively tightly, in order to allow compensation for thermal expansion of the cell block.

Furthermore, openings are provided in the cover plate, through which the supply lines and outlet lines for the gas flows that occur to pass through to the cell block.

To date, tie rods have been used to hold together the layers of fuel cells that form a fuel cell stack, with these tie rods being distributed around the circumference of the cell, passing through it and applying tensile forces to it from the outside, on both sides. In this case, it is not entirely unproblematic to use an elastic spring and a nut to set the prestress exactly. In particular, this is because each individual tie rod applies considerable forces and the thread pitches of the tie rod and a nut must be appropriately pretreated in order to ensure that the friction effect from all of the tie rods is approximately the same, and therefore that the forces are distributed uniformly on the cell stack. This is because the tie rods must be prestressed to such an extent that their prestressing can still adequately load the cell stack, even in the warm state during operation. For this purpose, the various material characteristics, such as the coefficient of linear expansion, the thermal conductivity and the specific thermal capacity of each component that is used, must be taken into account. With the present mixture of materials, as is normal in cell stacks according to the prior art, these parameters very quickly lead to instabilities, in particular when the cell stack is being started up and shut down, and in the event of load changes, since the different materials react to a temperature change at different rates. The different inertias of the materials involved lead not only to an individual local phase shift but also to an overall phase shift that affects all of the connections. The phase shifts are expressed in the form of mechanical stresses and distortion, both on the individual components and on the cell stack overall, which, in the long term and as a result of changing loads, lead to leaks and fractures at the very widely differing points and therefore represent a potential risk to the life of the cell stack. Tie rods therefore represent a highly unsatisfactory solution, which needs improvement.

According to the invention and as claimed in claim 13, the cell stack is therefore held together by a structure in which the tie rods, which are designed to apply tension, are replaced by a solution designed to apply pressure on both sides. This is done by means of a cup spring which presses the cell block against a stop in the axial direction and therefore holds the cell block positioned in between by the contact pressure that is produced by the cup spring. This has the advantage that the cup spring is no longer part of the cell stack, and that its material characteristics therefore no longer affect the cell stack. At the same time, only a considerably lower spring force is now required to build up the pressure that is required on the one hand to make contact between the anode electrode and the cathode electrode, and the current collectors on the other hand. The cup ring of this cup spring acts on the end surface of the cell block and therefore ensures that the forces enter the end surface of the cell block in a uniformly distributed manner. At the same time, the point contact between the cup base and its stop provides a compensating joint for the cell block, such that any axial expansion of the cell block, which may occur to a different extent, at the point at which the cup ring is connected to the cell block is compensated for by a tilting movement of the point contact. The phase shifts which are produced solely by the material mix of the individual fuel cells still remain in the cell block.

The life of the fuel cell is influenced to a significant extent by the way in which it is operated, in addition to its design. For this reason, the way in which the fuel cell is operated must be optimized.

As is known, the electrolyte matrix which separates the anode from the cathode is impregnated with lithioated electrolyte in order to improve the ionization at the cathode electrode and to emit electrons better at the anode electrode. However, the lithium reacts in the presence of steam and hydrogen over the course of time. The efficiency and the life of the anode chamber therefore suffer from loss of lithium. The reaction between the lithium and steam is governed by the following reaction equation:

$$2Li + 2H_2O \rightarrow 2LiOH + H_2$$

resulting in lithium hydroxide and hydrogen. Since the hydrogen in the anode temperature is at a temperature between 600° C. and 700° C., a second reaction also occurs, based on the following reaction equation between the lithium and hydrogen:

$$2Li + H_2 \rightarrow 2LiH$$

forming lithium hydride. These two reactions result in the electrolyte matrix continuously losing lithium on the anode side, as a result of which the anode electrode efficiency gradually decreases.

The invention as claimed in claim 15 proposes that no hydrogen flows in the anode chamber and that hydrogen be kept away from it by feeding only carbon monoxide (CO) as fuel gas to the anode chamber.

The object according to the invention is achieved in that an apparatus which holds back the hydrogen contained in the fuel gas is connected between the inlet to the anode chamber and the fuel gas source. An apparatus such as this may, for example, be a gas separator installation, such as a PSA installation, a membrane installation or a cryogenic installation, in which the hydrogen is separated selectively. A separator installation such as this makes it possible for the synthesis gas that is produced in a synthesis gas generator, for example from a steam reformer or a coal gasifier, to be distributed both to the fuel cell and for a further process, in which hydrogen is consumed, such as a PEM fuel cell. It is also possible to provide hydrogen networks in this way, which are supplied with hydrogen from different feed points. This results, for example, in the coal, which represents the greatest energy resource on the planet and is available on all continents, being of even more long-lasting importance for energy generation, in such a way that it will gain ever more importance in the energy market, resulting in a mixed gas composed of carbon monoxide and hydrogen being obtained by reformation from it using gasification processes. While the carbon monoxide is converted in the melt carbonate fuel cell, the hydrogen budget for the hydrogen that is required is available to an adequate extent, thus allowing, for example, motor vehicles to be operated in an environmentally friendly manner.

If the anode is fed only with carbon monoxide as the fuel gas, in the absence of hydrogen, then this results in yet another life-extending advantage, in that the chemical reaction $$K_2CO_3 + H_2O \leftrightarrow 2KOH + C_2$$

which otherwise takes place in the anode chamber, with the electrolyte decomposing, does not take place owing to the lack of water. In this case, the anode is no longer subjected to moist gas, which results in the KOH, which is still significantly volatile at 650° C., no longer being removed from the anode chamber.

In addition to the anode chamber, the central cathode chamber is also subject to a life-shortening load. The cathode material is therefore subject to the requirement for it to be sufficiently electrically conductive, mechanically robust and chemically inert in the presence of the electrolyte. Lithioated nickel oxide has the required characteristics, with the exception of the chemical stability. Those skilled in the art know that the nickel-oxide cathodes will gradually dissolve under the influence of carbon dioxide, thus leading to an accumulation of nickel ions in the electrolyte matrix which themselves further promote diffusion and dissolving. The nickel ions diffuse in the direction of the anode, where they are reduced to elementary nickel by the negative electrochemical potential which is formed by the dissolved hydrogen. The nickel grains that are formed can produce electrically conductive links, which can lead to short circuits within the electrolyte matrix. The effect is further exasperated when the carbon dioxide partial pressure is high, since the nickel oxide dissolves in accordance with the following mechanism:

$$NiO + CO_2 \leftrightarrow Ni^{2+} + CO_3^{2-}.$$

It is therefore a requirement for a solution which stops and breaks down the described mechanism.

According to the invention and as claimed in claim 16, the object is achieved in that the central cathode chamber is fed only with a gas containing oxygen, in the absence of carbon dioxide.

The anode exhaust gas which is passed through the cathode chambers in conventional fuel cells and has been oxidized already in the presence of hydrogen ($H_2$) in the anode chamber to form steam leads to a loss of lithium and electrolyte in a cathode chamber such as this, in the same way as in the anode chamber. This loss no longer occurs with the new fuel cell, since the anode exhaust gas is preferably kept away from the central cathode chamber and, instead of this, is supplied to the outer cathode chamber. No significant loss of electrolyte or lithium therefore occurs in the central cathode chamber. At the same time, the absence of water adjacent to the cathode electrode prevents any corrosive reaction with the electrolyte and the lithium, which, in contrast to carbon dioxide, is alkaline rather than acidic.

All that still remains is the moisture in the air, through which the central cathode chamber is subject to a basic reaction. According to the invention, claim 17 proposes, in order to preclude a reaction such as this, that the air oxygen be dried, if the air humidity is too high, before entering the central cathode chamber, thus removing the reaction partner $H_2O$ for the lithium and the $K_2CO_3$. This is done, for example, by means of a drier, preferably an absorption or adsorption drier, which is located between the atmosphere and the inlet to the central cathode chamber.

The central cathode chamber is therefore preferably fed with gas containing oxygen. At the same time, the cooling problem still exists in the anode chamber and the outer cathode chamber. The anode chamber has already been partially reliably cooled and this cooling can also be maintained to a restricted extent in all operating states by using the emerging fuel gas leakage and the carbon dioxide as coolant. However, the situation for the outer cathode chamber is different. Here, the cooling ceases as soon as the gas containing carbon dioxide no longer has any extraneous gases and the carbon dioxide has been completely absorbed by the electrolyte. In order to achieve this object, there is therefore a requirement for an effective coolant apparatus to extract the excess heat both from the anode chamber and the outer cathode chamber.

According to the invention and as claimed in claim 18, this object is achieved in that the central cathode chamber is cooled by a circulating gas which dissipates the heat absorbed in the central cathode chamber to an external heat exchanger. The solution is implemented by an oxygen-enrichment installation which feeds the circulating gas with air oxygen whose oxygen concentration is higher than that of the circulating gas. This can be done by means of an oxygen-recovery installation, for example a PSA or membrane installation. An apparatus such as this makes it possible to continuously readjust the consumed oxygen in the central cathode without an excessively large amount of exhaust air being produced at the outlet which, depleted of oxygen, is dissipated into the atmosphere. After readjustment of oxygen-rich air, whose oxygen concentration is higher than that of the air carried in the circuit for cooling purposes, the oxygen concentration in the circulating gas is kept constant. This has the advantage that the circulating gas is passed through the cathode chamber considerably more often, and the waste heat can be adsorbed and dissipated more quickly as a result of the greater air flow rate. The heat dissipated in this way from the cathode chamber is extracted in a heat exchanger which short-circuits the input and the output of the cathode chamber. With a fan connected in series with the heat exchanger, the flow rate is for this purpose adjusted such that the values of the inlet temperature and that of the outlet temperature approach one another such that the material stress in the central cathode chamber caused by the temperature difference falls to a minimum. Furthermore, the process of matching the two temperature values has the advantage that the central cathode chamber can be operated at a higher inlet temperature. The heat exchanger operated in the circuit with the central cathode chamber therefore provides a heat source with a high temperature gradient, while the air that has been depleted of oxygen is emitted from the circulating gas via an output line. The enthalpy in the exhaust air is, however, still sufficient to feed heat to a further heat exchanger, because of the high temperature gradient, thus virtually completely utilizing the waste heat from the central cathode chamber. In addition, a major proportion of the waste heat produced in the fuel cell, preferably between 30% and 70%, can be discharged with the circulating gas in the heat exchanger concentrated in such a way that this makes it possible to vary the flow rates in the adjacent anode chamber and the outer cathode chamber over a relatively wide range. Finally, the circulation of the air oxygen has the advantage for the electrical efficiency of the fuel cell that a uniform high oxygen concentration level occurs within the central cathode chamber, as a result of the permanent excess oxygen. The absence of carbon dioxide results in yet another advantage in that the formation of peroxide at the cathode electrode based on the reaction $$O_2^{2-} + 2e \rightarrow 2O^{2-}$$

takes place in a better form, and this results in a reduction in the electrochemical polarization losses, and thus an improvement in the efficiency. The $O^{2-}$ ion in this case reacts with the $CO_2$ in melt based on the reaction:

$$O^{2-} + CO_2 \rightarrow CO_3^{2-}.$$

The electrolyte in the outer cathode chamber, in contrast to the anode chamber and the central cathode chamber, does not require lithium to be added, since it is not involved in the reception and emission of electrons. In contrast to the electrolyte matrix between the anode chamber and the central cathode chamber, electrolyte is lost in the electrolyte area of the outer cathode chamber only as a result of the moisture in the cathode gas, which can be compensated for. This is done in the manner already described by connection to a repository.

The three-chamber technique results in the fuel cell being particularly preferably suitable for the sequestration of carbon dioxide from gas mixtures containing carbon dioxide. In one particularly advantageous refinement, the fuel cell is operated in the absence of hydrogen as the fuel gas. In this case, no water vapor is produced at the output of the anode chamber after conversion of the fuel gas. If the carbon dioxide is then extracted from the exhaust gas, then the fuel gas contained in it and which has not been converted can all be fed back to the inlet of the anode chamber without this leading to an accumulation as a result of extraneous gases in the anode chamber. According to the invention and as claimed in claim 19, this is achieved in that the cracked gas from the ionic flow and the carbon dioxide from the cold combustion as well as the fuel gas that is not converted to carbon dioxide is pressure-loaded in a pressure increasing process such that the pressure load value that is reached is above the critical pressure for carbon dioxide. Following this, the enthalpy is extracted from the pressure-loaded gas in a cooling process, to such an extent that the enthalpy which still remains in the carbon dioxide is below the critical temperature, and the carbon dioxide changes from its gaseous to its liquid aggregate state. For this purpose, the outlet of the cooling process is connected to the inlet of a pressure reservoir, in which a liquid column composed of carbon dioxide is formed, above which the fuel gas that has not been liquefied is located, and which is drawn away via the head area of the pressure reservoir, and is fed once again as fuel gas to the anode chamber. This has the advantage that excess fuel gas from the pressure reservoir is used for operation, and the anode chamber can thus be additionally cooled. At the same time, the outer cathode chamber is supplied with a gas containing carbon dioxide, and the central cathode chamber is supplied with a gas containing oxygen, by which means the ionic flow between the cathode and the anode is maintained. The solution that has been found has the advantage that the method carries out five tasks within a circuit, to be precise (a) separation of carbon dioxide from a gas containing carbon dioxide, (b) liquefaction of the separated carbon dioxide, (c) complete conversion of the fuel gas, (d) cooling of the anode chamber and (e) recovery of hydrogen, in which case there is neither any need to supply additional energy for the separation process nor does the said sequestration process create any further carbon dioxide.

At the same time, the liquid carbon dioxide can be drawn off continuously from the bottom area of the pressure reservoir, and can be transported away via a pipeline, for example to a reserve or for operation that maintains the carbon dioxide. The reserves may, for example, be crude-oil fields, coal veins, caverns and aquifers. When carbon dioxide is introduced into crude-oil reserves, it is possible, for example, to increase the oil feed rate. If it is forced into a coal vein, then the methane that has accumulated adjacent to the coal can be exploited, while the coal vein holds the carbon dioxide in it by adsorption. Furthermore, the yield of chemical processes, such as the methanol process, can be increased by the carbon dioxide. For example, the excess amounts of carbon dioxide can also be finally stored in exhausted salt mines and natural-gas fields, avoiding the atmospheric load resulting from the unwanted amounts of exhaust gas created.

Furthermore, the conversion of carbon monoxide in the absence of hydrogen has the advantage that the carbon dioxide leaving the anode chamber is dry and not moist. This is particularly important when the carbon dioxide subsequently has to be transported through a pipeline. This is because, in order to prevent pipeline corrosion, the moisture must very largely be extracted from the carbon dioxide in advance. The gases are normally dried by adsorption in an adsorption drier in that the adsorbent adsorbs the moisture. However, drying in this way does not work when hydrogen is present as a fuel gas, since the amount of water produced by the combustion of the hydrogen cannot be coped with by adsorption drying on its own.

The carbon dioxide which is separated from the gas mixture containing carbon dioxide, and the hydrogen that is released results in an emission credit for the operator, provided that he does not release the carbon dioxide that has been separated back into the atmosphere. Emission credits such as these represent a valuable financial benefit in financial life reached on the "national allocation plans". These rules state on the basis of which key which installation is given what emission rights. If the allocated values are exceeded, then the operator has to purchase additional contamination rights. On the other hand, any one who decreases the carbon dioxide emissions and therefore produces reduced exhaust gas amounts, by sequestrating the carbon dioxide and permanently keeping it out of the atmosphere, can sell the contamination rights allocated to him. There is therefore a requirement for a method by means of which such rights can be obtained.

According to the invention and as claimed in claim 20, the object is achieved in that the connection between the atmosphere and the source which contains carbon dioxide and is connected to the atmosphere is interrupted, and the ends of the interruption are connected to a carbon-dioxide separation process, for example in the form of a fuel cell, and the sequestration process extracts the carbon dioxide that would be intended for the atmosphere from a gas mixture which contains carbon dioxide, converts the extracted carbon dioxide to a different substance, or permanently supplies it to a receiving location.

According to the invention and as claimed in claim 21, the separation process is carried out by a fuel cell such that the source which contains carbon dioxide is connected to the inlet of the outer cathode chamber, and its outlet is connected to the atmosphere; the inlet of the anode chamber is connected to a fuel gas source and its outlet is connected to an output line for the carbon dioxide from the separation process; the inlet of the central cathode chamber is connected to a source which contains oxygen, and its outlet is connected to the atmosphere.

The gas mixture that contains carbon dioxide is passed via the inlet to the outer cathode chamber of the fuel cell before emerging into the atmosphere, with the gas mixture carbon dioxide content being depleted therein. The gas mixture whose carbon dioxide content has been depleted leaves the outer cathode chamber via its outlet and is passed via a connection, for example the chimney, into the atmosphere. At the same time, the central cathode chamber is fed with oxygen via its inlet from a source that contains oxygen. Together, the two cathode chambers generate a carbonate ion flow in the electrolyte of the fuel cell, which flows from the cathode to the anode and is discharged in the anode chamber. For this purpose, the anode chamber is fed via its inlet with fuel gas, which is converted by the discharge of the carbonate ions in the anode chamber. A gas mixture composed of carbon dioxide and partially unconsumed fuel gas then leaves the anode chamber via its outlet. While the carbon dioxide is passed from the outlet of the anode chamber to a transport apparatus and via a connection to a location for receiving carbon dioxide, the unconsumed fuel gas is fed back to the inlet of the anode chamber.

Depletion of the carbon dioxide from the gas mixture that contains carbon dioxide in the outer cathode chamber of the fuel cell has the advantage that the gas mixture may contain any desired amount of moisture resulting, for example, from a sulfur-extraction installation without this leading to any disadvantageous effect. Furthermore, residual amounts of sulfur in the gas mixture flowing through the outer cathode chamber can be tolerated since parts which come into contact with the gas in the outer cathode chamber are preferably composed of ceramic. Finally, the solution also has the advantage that, with the exception of $CO_2$ liquefaction and its transport, the process is driven by the carbon dioxide itself, which means that no more $CO_2$ is produced, nor is energy required for the separation process.

The carbon dioxide from the separation process can be used to operate further processes, for example those with chemoautotrophic bacteria or algae, in that these are fed with carbon dioxide via a connection, in conjunction with hydrogen sulfide ($H_2S$). Bacteria such as these have the advantage that they can metabolize the carbon dioxide in water at about 100° C. and at a pressure of preferably 200 to 250 bar, without light, so that a continuous process can be carried out in pressurized reactors, irrespective of the time of day. Such living objects can be found in the immediate vicinity of hydrothermal vents in the seabed at a depth of about 2500 m.

In Science [289(5483): 1307], Günter Wächtershäuser reported, under the title "Origin of life: Life as We Don't Know It", on the metabolism of these living objects. If the living area that was discovered is transferred to a bioreactor, then the carbon dioxide is converted to proteins etc., which is supplied to the metabolism circuit. Since a very large number of processes in the petrochemical and chemical industries are operated with excess heat, claim 22 proposes, according to the invention, that the thermal process be connected, together with an $H_2S$ source and a $CO_2$ source, for example in a power station, a refiner, a methanol installation, a cement mix etc., to a reactor such as this.

Figure 10:
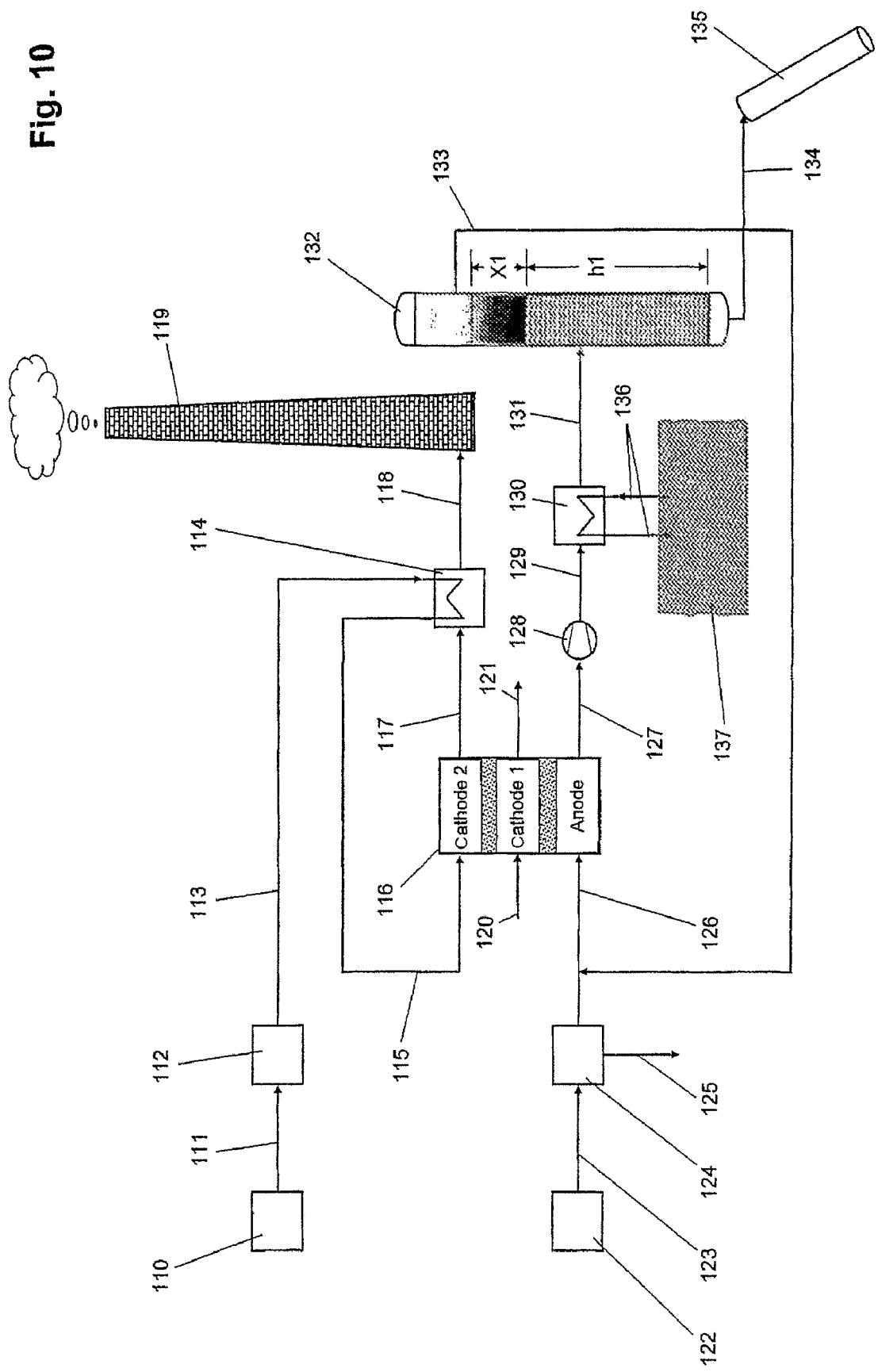
FIG. 10 shows a fuel cell which is connected between a flue gas purification installation for a coal-fired power station and the chimney and which removes the carbon dioxide contained in the flue gas, liquefies it and transports it via a pipeline to a final store, while the flue gas from which the carbon dioxide has been removed passes through the chimney into the atmosphere.
Figure 11:
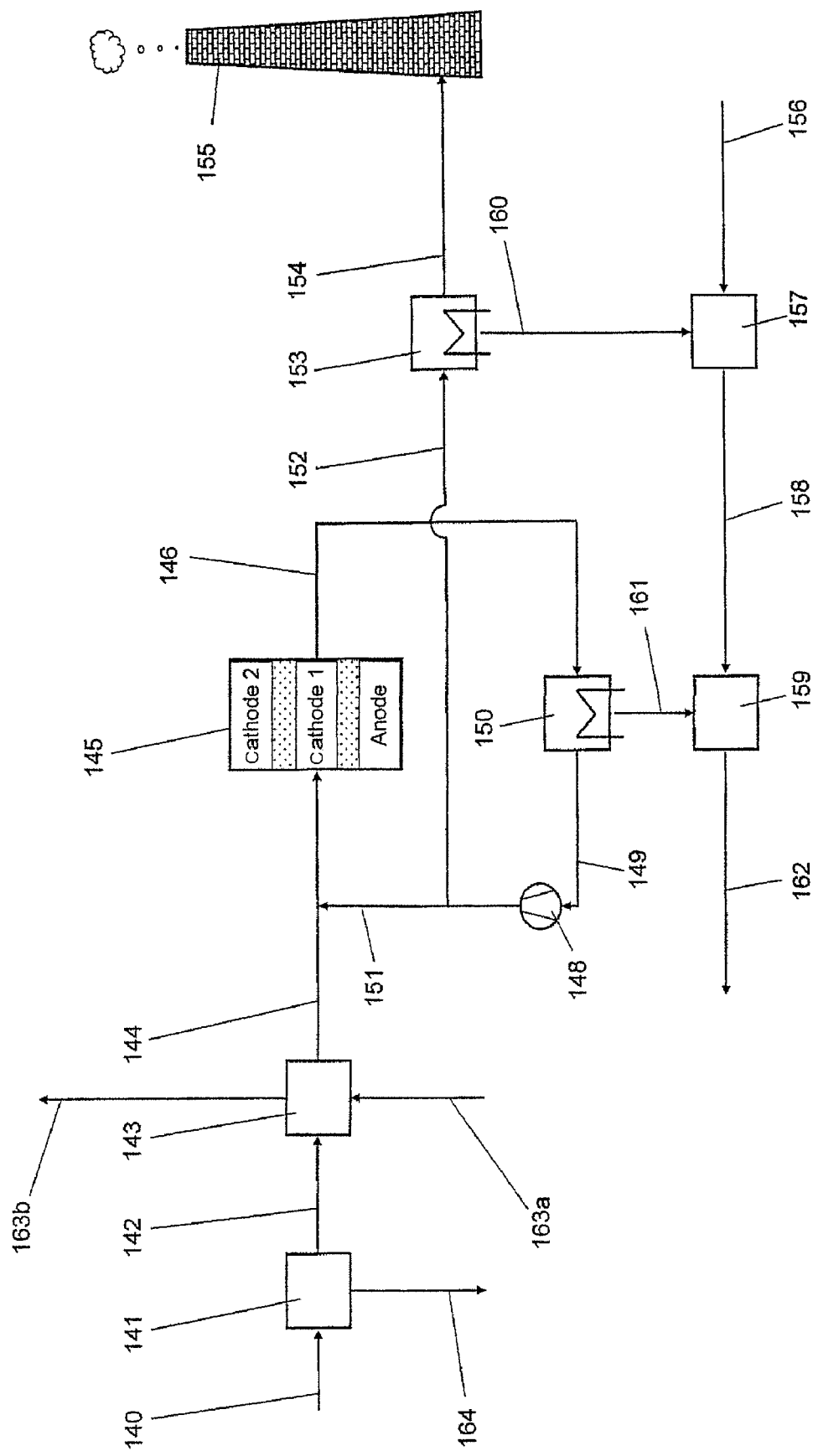
FIG. 11 shows a fuel cell which is connected between an oxygen source and a chimney and in which the oxygen is used on the one hand for the conversion process and on the other hand for cooling the fuel cell, while the air, depleted of oxygen, is passed via the chimney into the atmosphere.
Figure 12:
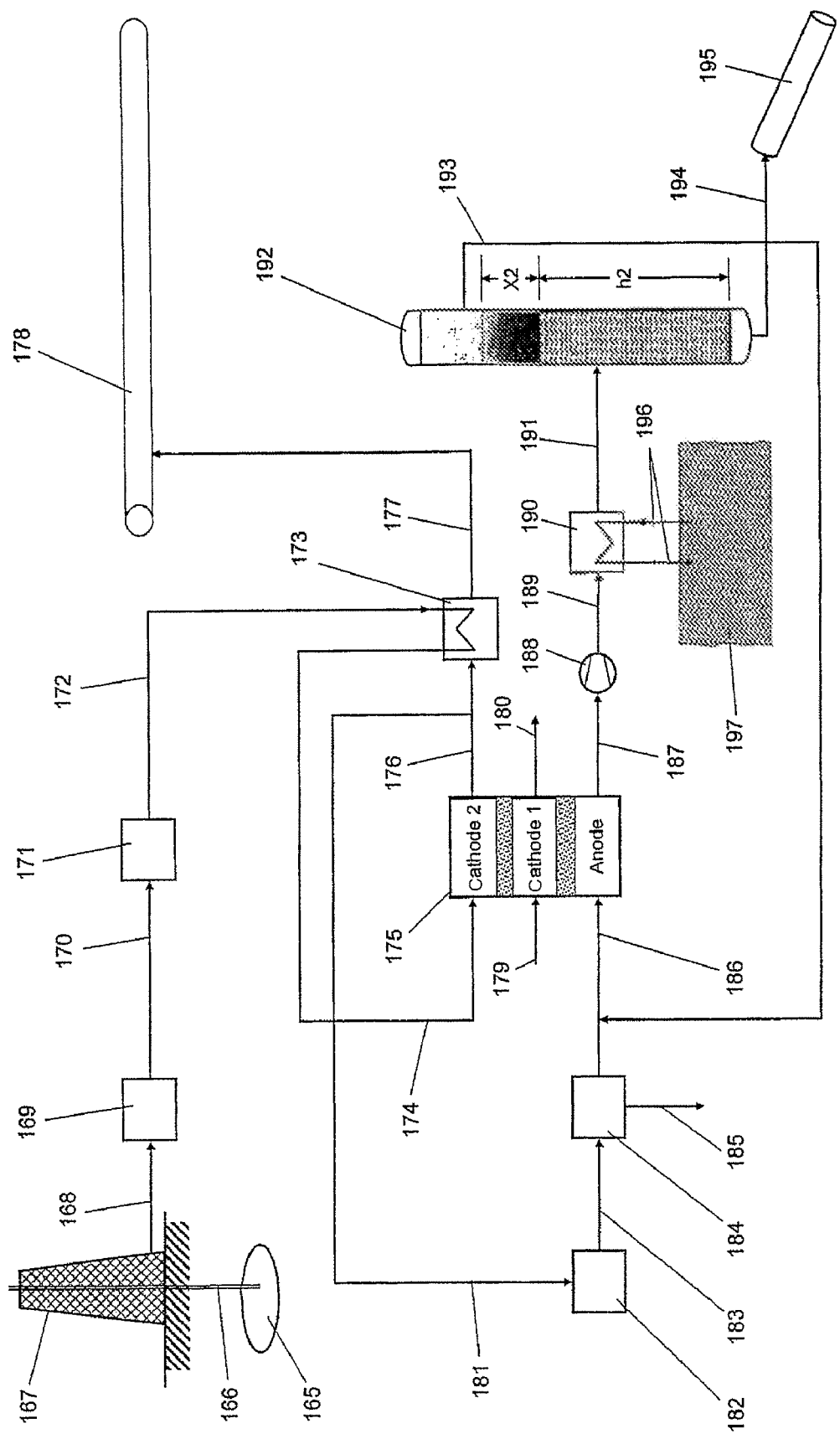
FIG. 12 shows a fuel cell at a natural gas storage facility, which extracts the carbon dioxide from the natural gas being conveyed and feeds the purified natural gas into a pipeline, which transports the natural gas to the consumers, while the carbon dioxide that has been liquefied from the natural gas is transported via a second pipeline to a cavern, where it is finally stored.
Figure 13:
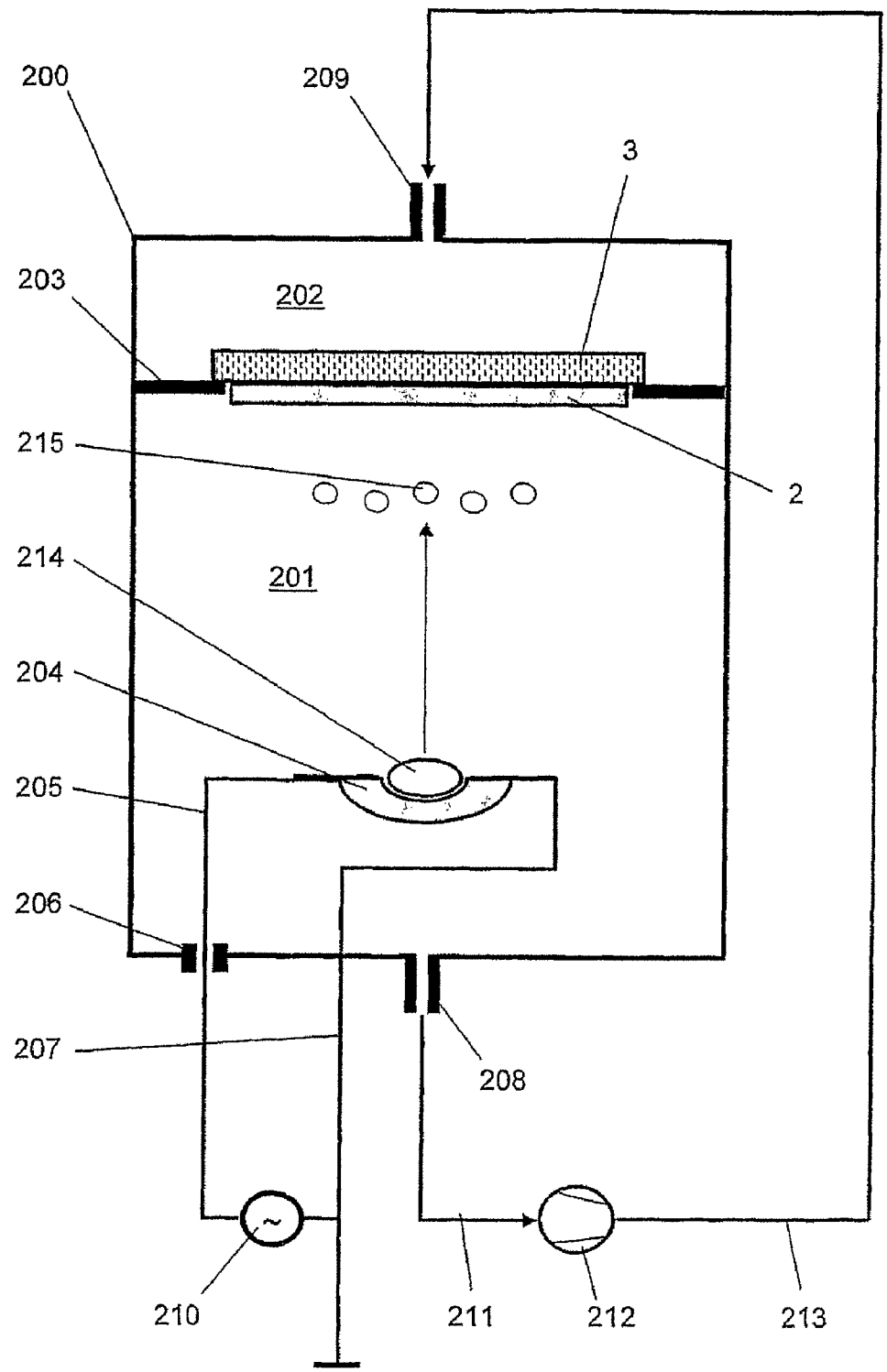
FIG. 13 shows a vapor-deposition process, in which an electrolyte matrix is coated with a gas-permeable anode electrode.
Figure 14:
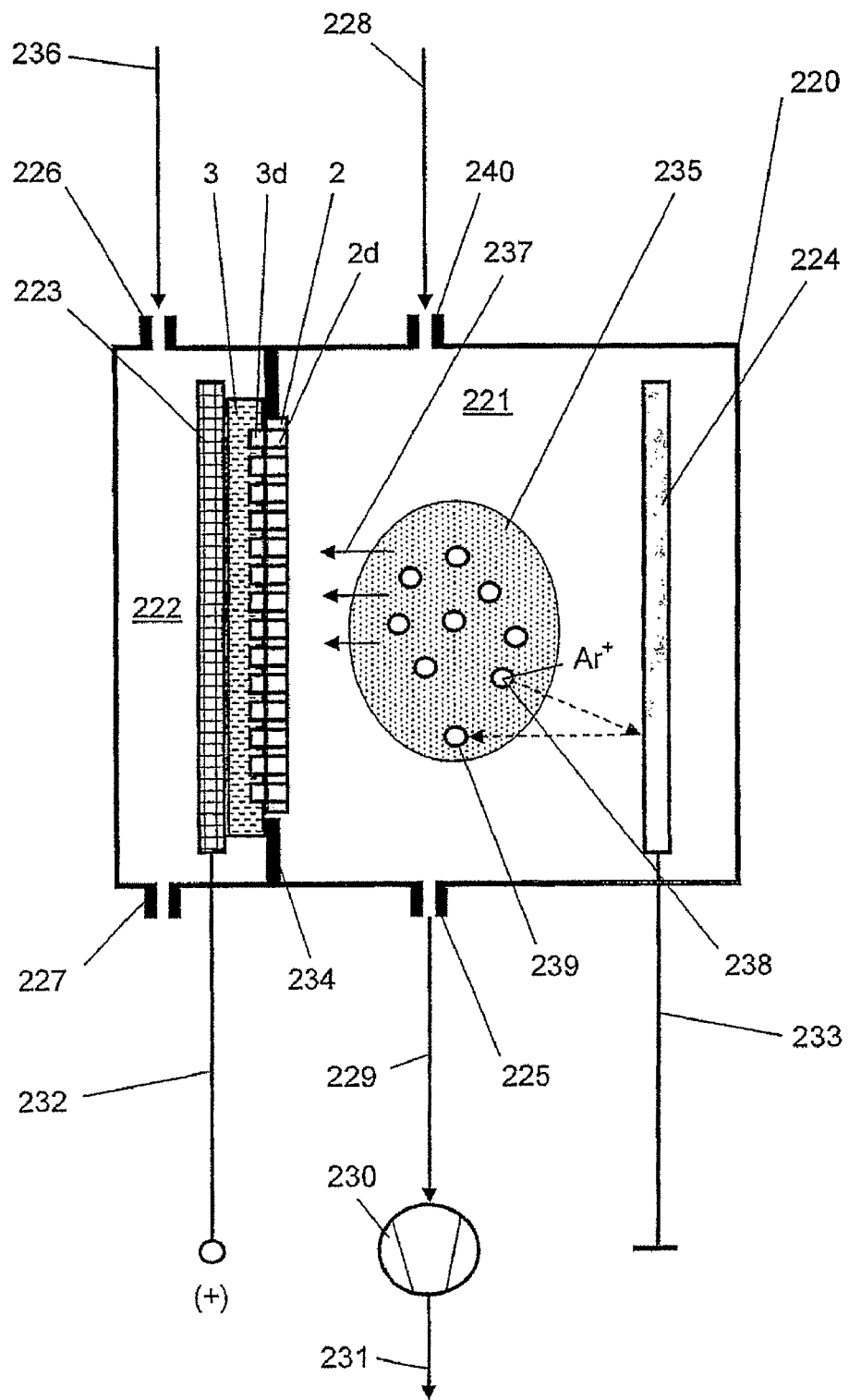
FIG. 14 shows a sputtering process, in which an electrolyte matrix is coated with a gas-permeable anode electrode.

The present invention will be explained in more detail with reference to the attached FIG. 1. FIG. 2 shows a capacitor in a fuel cell according to the prior art. In comparison to this, a new, half capacitor is described in FIG. 3. FIGS. 4 to 9 schematically illustrate the individual steps for assembling the individual components of a cell to form a cell block that is ready to operate. FIG. 10 shows the fuel cell in conjunction with a coal-fired power station as a sequestration installation, in which it extracts the carbon dioxide from the flue gas, and liquefies it in a liquefaction installation. The waste heat from the fuel cell process is for this purpose carried away by means of a cooling apparatus, as is illustrated in FIG. 11 and in which the circulating air oxygen is used as a cooling medium. Finally, FIG. 12 shows the fuel cell in conjunction with a natural-gas reservoir, where the natural gas is purified by means of the fuel cell by extracting the carbon dioxide from the natural gas by means of the fuel cell process, with the carbon dioxide being liquefied in a liquefaction installation and being finally stored in an aquifer, while the purified natural gas is passed via a pipeline to the consumer. The coating of the electrolyte matrix with an electrically conductive anode electrode is illustrated in FIGS. 13 and 14.

Figure 2:
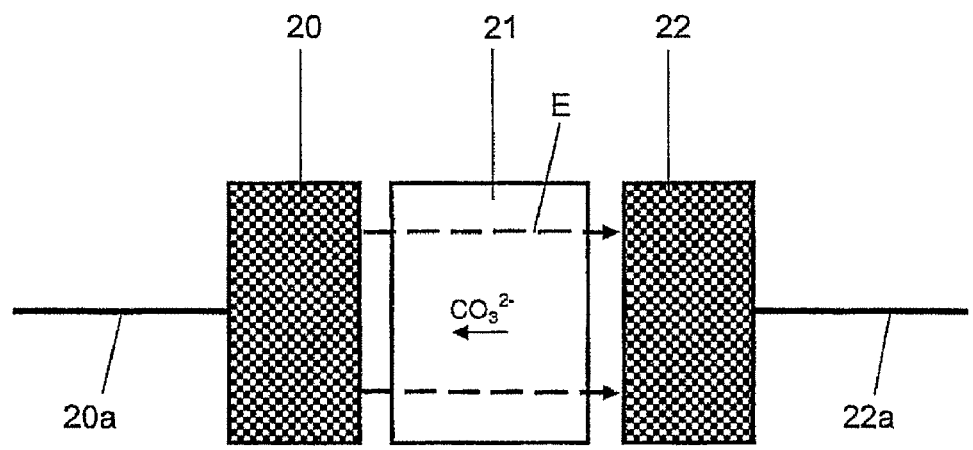
FIG. 2 schematically shows a capacitor in a fuel cell according to the prior art.

FIG. 1 shows the fuel cell which, in the interior, comprises the anode chamber, two cathode chambers, two electrolyte matrices and the electrolyte channel which connects the two electrolyte matrices to one another.

The inlet of the anode chamber (1) is fed via the line (9) with fuel gas ($H_2$ and/or CO), which is oxidized in the anode chamber (1) by the oxygen from the $CO_3^{2-}$ ion flow in a cold combustion process to form $H_2O$ and $CO_2$. The components resulting from the oxidation then emerge, together with the cracked gas $CO_2$, from the $CO_3^{2-}$ ion flow via the outlet (12) from the anode chamber (1).

The inlet of the cathode chamber (5) is fed with oxygen from the air via the line (10). The oxygen is oxidized adjacent to the cathode electrode (4) in the cathode chamber (5), with electrons being supplied at the same time. The ionic oxygen ($2O^{2-}$) enters the electrolyte (3) and forms carbonate ions with the carbon dioxide dissolved in the melt. The air, which has been depleted of oxygen, then leaves the cathode chamber (5) via the outlet (13).

The inlet to the cathode chamber (7) is fed with a gas that has been enriched with carbon dioxide, via the line (11). The carbon dioxide contained in the gas is absorbed by the electrolyte (6) in the cathode chamber (7). The absorbed carbon dioxide is dissolved in the electrolyte (6) and flows as carbonate via the electrolyte channel (8) in the direction of the cathode electrode (4) and electrolyte (3), while the gas that has been depleted of carbon dioxide leaves the cathode chamber (7) via the outlet (14).

The anode electrode (2) in the anode chamber (1) is connected via an electrical connection (2b) to the current collector (2a), to which an electrical connecting wire (15) is connected. The other end of this connecting wire (15) is connected to the input of an electrical load (17). The electrons (18) which have been stripped off at the anode electrode (2), from the media (hydrogen ($H_2$) and/or carbon monoxide (Co)) that emits electrons, are fed via this wire to the electrical load (17), in which they carry out work.

The cathode electrode (4) in the cathode chamber (5) is connected via an electrical connection (4b) to the current collector (4a), to which an electrical connecting wire (16) is connected. The other end of this connecting wire (16) is connected to the output of an electrical load (17). The electrons (19) which have been depleted in the electrical load are fed via this wire into the cathode electrode (4), by means of which the ionization process at the cathode electrode (4) is driven. The individual $CO_3^{2-}$ ions are then formed in the electrolyte (3) by in each case feeding one half of an oxygen molecule through the cathode electrode (4) and an entire $CO_2$ molecule through the electrolyte channel (8), as well as two electrons supplied from the electrically conductive wire (16).

The carbonate ions ($CO_3^{2-}$) produced by the ionization process at the interface between the cathode chamber (5), the cathode electrode (4) and the electrolyte (3) flow from the interface between the cathode electrode (4) and the electrolyte (3) in the direction of the anode electrode (2), and are discharged at this electrode by splitting each individual $CO_3^{2-}$ ion into half an oxygen molecule and a $CO_2$ molecule.

FIG. 2 schematically shows the design of a capacitor as is used according to the prior art in fuel cells. The two capacitor plates (20) and (22) are in the form of a metal sponge and form the anode (20) and cathode (22) for the fuel cell process. The two electrodes are separated from one another by the electrolyte housing (21), which is filled with electrolyte. The electrical field (E) which is produced between the two capacitor plates and passes through the electrolyte is attenuated by the electrolyte (21), which acts as a dielectric, only at the boundary surface between the capacitor plate and the electrolyte. The capacitance which the anode and cathode electrodes as a metal sponge are able to provide therefore cannot be used either on one side or the other side, since there is no layer to reinforce the charge, and surrounding the metal sponge—specifically the dielectric in the form of the electrolyte—around the surface. The motion of the carbonate ions ($CO_3^{2-}$) in the electrolyte (21) is thus restricted by the absence of further polarization charges and by the electrical field (E), which in consequence is less attenuated, in their flow from the cathode (22) to the anode (20). Assuming that the voltage between the two capacitor plates (20) and (22) remains unchanged, only a reduced current can therefore flow via the connections (20a) and (22a).

Figure 3:
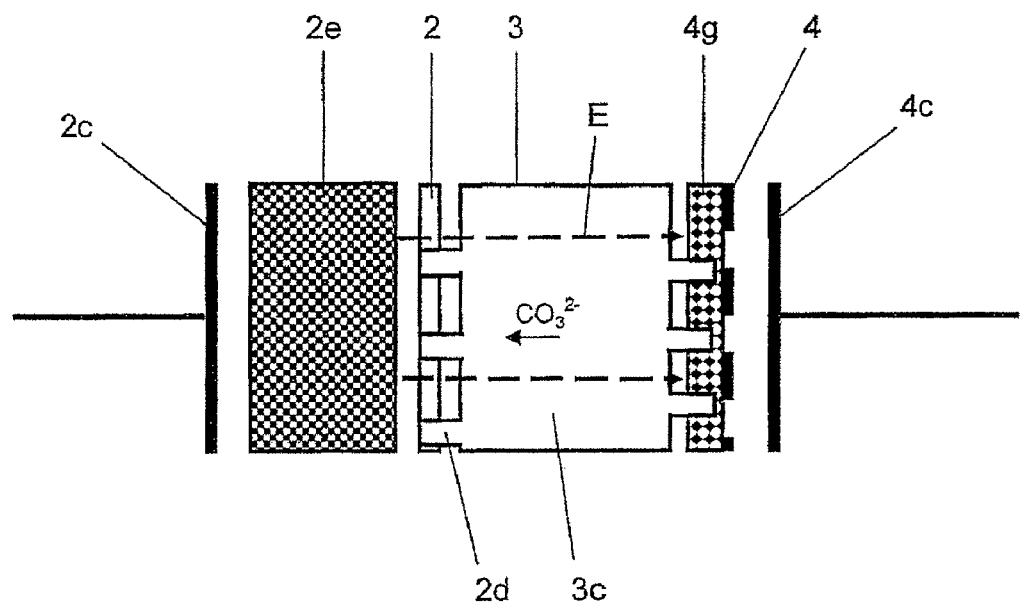
FIG. 3 shows, schematically, the design of the capacitor according to the invention.

FIG. 3 illustrates the further development of the capacitor, which is in the form of a modular design composed of only two parts rather than three parts and comprises on the one hand an ionically conductive half capacitor with a cathode electrode, an electrolyte matrix, a cathode capacitor plate and an ionically permeable anode electrode, and, on the other hand, a separate anode capacitor plate, which is connected by contact pressure to the anode electrode.

FIG. 3 shows, schematically, the design of the capacitor. On the anode side, this capacitor comprises the electrical connection (2c) for the anode capacitor plate (2e) and the ionically permeable anode electrode (2). On the cathode side, it has the cathode capacitor plate (4g) with the cathode electrode (4), which is connected to the electrical connection (4c). The two capacitor plates are separated by the electrolyte matrix (3) and the anode electrode (2). The common electrolyte (3c) passes through the electrolyte matrix (3) and the cathode capacitor (4g), extending to the passage (2d) of the anode electrode (2), to which they are connected and thus form a connection to the cathode electrode (4).

The anode electrode (2) is in the form of a dense metal layer, and is firmly connected to the electrolyte matrix (3). At the points at which pore spaces are located in the electrolyte matrix (3), this electrolyte matrix (3) is provided with passages (2d) through which the cracked gases carbon dioxide and oxygen emerge from the electrolyte (3c), once the carbonate ions ($CO_3^{2-}$) have been electrically discharged. The electrical field (E) is produced between the two capacitor plates (2e) for the positive pole and (4g) for the negative pole. This field is created as soon as the porous anode capacitor plate (2e) is connected to the anode electrode (2). The electrolyte (3c) passes through the metal sponge of the cathode capacitor plate (4g) completely, and penetrates on the anode side as far as the passages (2d) in the anode electrode (2), thus creating an ionic connection between the electrodes (2, 4). The electrolyte reinforces the charge, as a dielectric, in the cathode capacitor plate (4g), thus reducing the physical size of the cathode capacitor plate.

Figure 4:
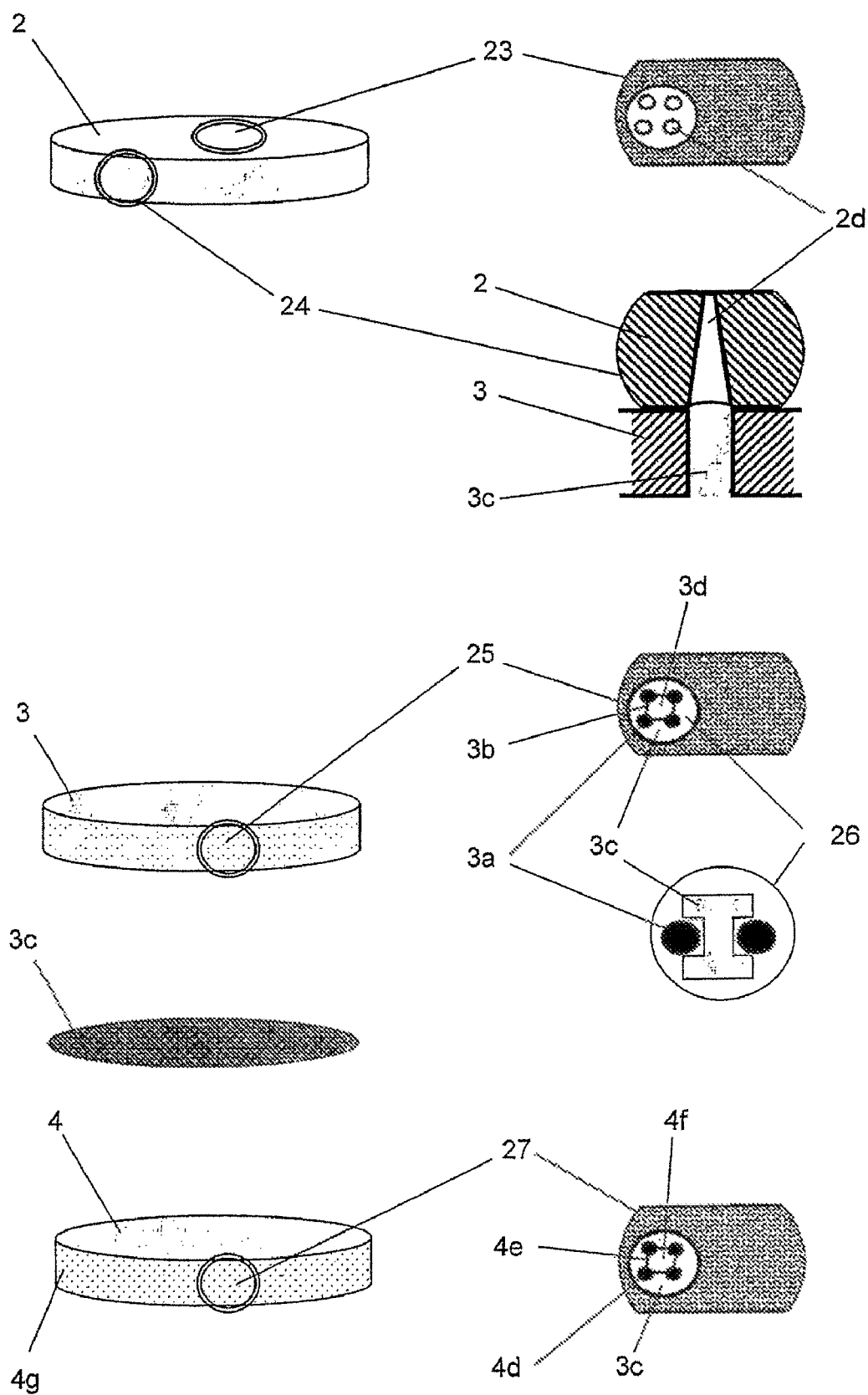
FIGS. 4 to 9 schematically illustrate the individual steps for assembling the individual components of a cell to form a cell block that is ready to operate.

FIG. 4 shows, schematically, the half capacitor in the form of an exploded illustration. In detail, FIG. 4 shows the anode electrode (2), the electrolyte matrix (3) and the cathode capacitor plate (4g).

The surface of the anode electrode (2) is illustrated in the form of an enlargement (23), and illustrates the electrode with the passages (2d), with the electrolyte (3c), as is shown in the enlargement (24), being connected at the passage (2d) to the anode electrode (2).

The design of the electrolyte matrix (3) is illustrated schematically by the enlargement (25). The individual ceramic bead (3a) is connected via the connection (3b) to an adjacent ceramic bead, while the electrolyte (3c) passes through the pore spaces (3d) in the electrolyte matrix (3). The enlarged detail (25) is illustrated once more enlarged in the enlargement (26), which schematically illustrates how the electrolyte (3c) passes through between two ceramic beads (3a).

The cathode electrode (4) is illustrated in an enlarged form (27) and schematically shows the porous structure of the electrode. The individual metal bead (4d) is connected via the connection (4e) to an adjacent metal bead, and the pore space (4f) is filled with electrolyte (3c). The electrolyte (3c) fills the pore spaces (3d) and (4f) and adhesively bonds the electrolyte matrix (3) to the cathode capacitor plate (4g). That side of the cathode capacitor plate (4g) which is opposite the adhesive-bonding point is used as the cathode electrode (4).

Figure 5:
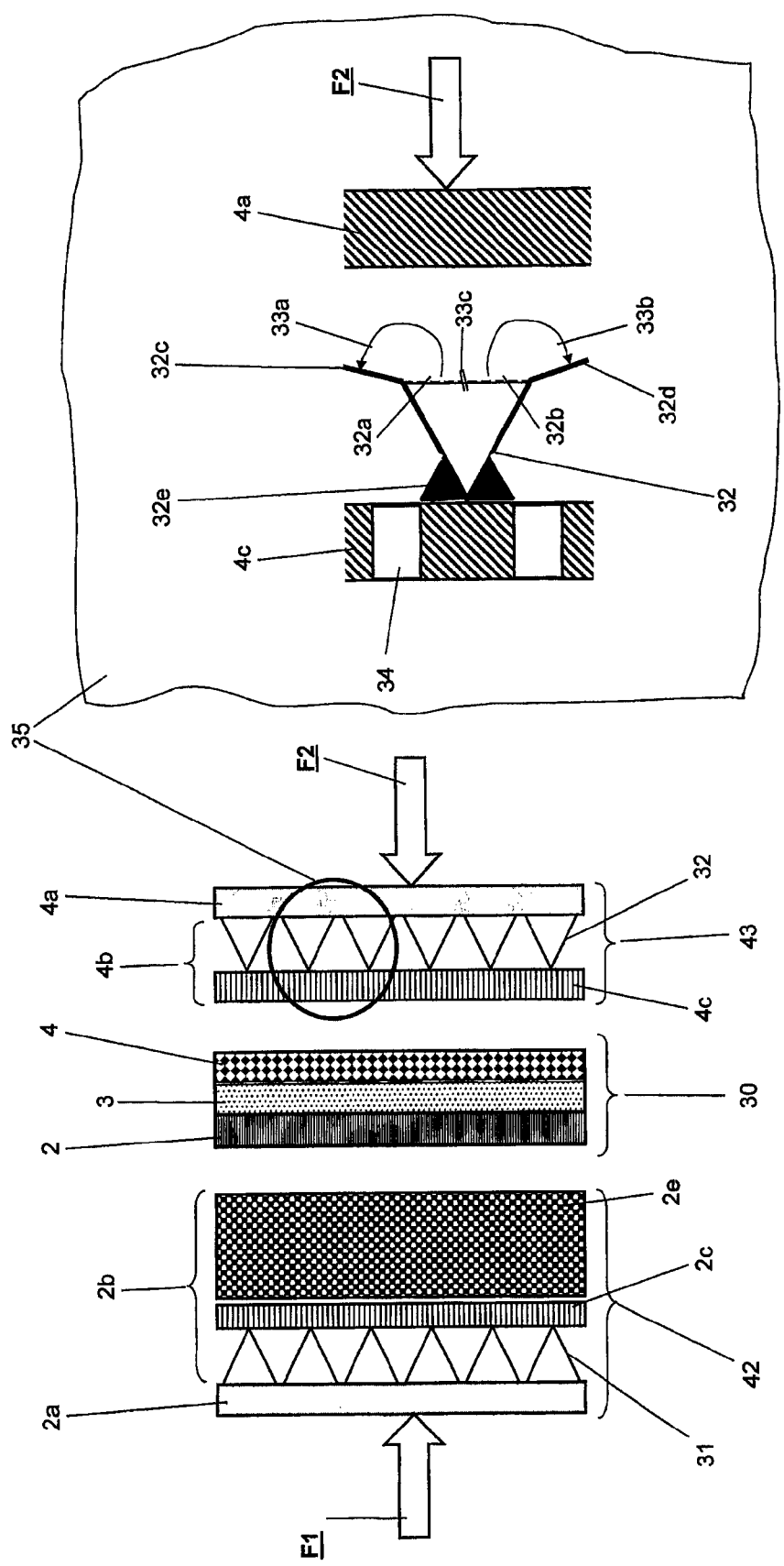

FIG. 5 shows, schematically, the design of an anode chamber and cathode chamber, which have been further developed in comparison to a metal sponge, in the form of an exploded drawing. In detail, FIG. 5 shows the current collector (2a) with the electrical connection (2b) for the anode electrode (2), which comprises the triangular profile (31) and the perforated metal sheet (2c), and the anode capacitor plate (2e) as porous sponge. Furthermore, the figure shows the current collector (4a) with the electrical connection (4b) for the cathode electrode, which comprises the triangular profile (32) and the perforated metal sheet (4c). The half capacitor (30), which comprises the layers formed by the anode electrode (2), the porous electrolyte matrix (3) and the cathode electrode (4), is located between the two. The contact forces F1 and F2 act in the illustrated direction on the current collectors (2a) and (4a). The current collectors are connected via the connections (2b) and (4b) to the electrodes (2) and (4) of the half capacitor (30).

The enlargement (35) shows the profiled body (32) with the adjacent grating metal sheet (4c) and the current collector (4a), in a magnified form. The tip of the latter is positioned on the perforated metal sheet (4c), with its hole passages (34). The equilateral profiled body (32) is firmly connected to the weld beads (32e) on the perforated metal sheet. The triangular limb which, in an imaginary form, runs parallel to the grating metal sheet (4c) and is illustrated by a dashed line is likewise divided, in an imaginary form, centrally by the separating line (33c), as shown, into the limb halves (32a) and (32b). The limb halves are folded around (33a) and (33b) to form the spring (32c) and (32d).

Finally, the current collector (4a) is pressed by the force F2 acting on it against the springs (32c) and (32d), thus pressing the connection (4b) against the cathode electrode (4) of the half capacitor (30) and making the contact. This is done in the same sense on the opposite side between the current collector (2a) by the force F1, by means of which the connection (2b) makes the contact with the anode electrode (2) of the half capacitor (30).

The current collector (2a), the profiled body (31), the perforated metal sheet (2c) and the anode capacitor plate (2e) fill the anode area (1) and form a functional unit (42).

The current collector (4a), the profiled body (32) and the perforated metal sheet (4c) fill the cathode area (5), and form a functional unit (43).

Figure 6:
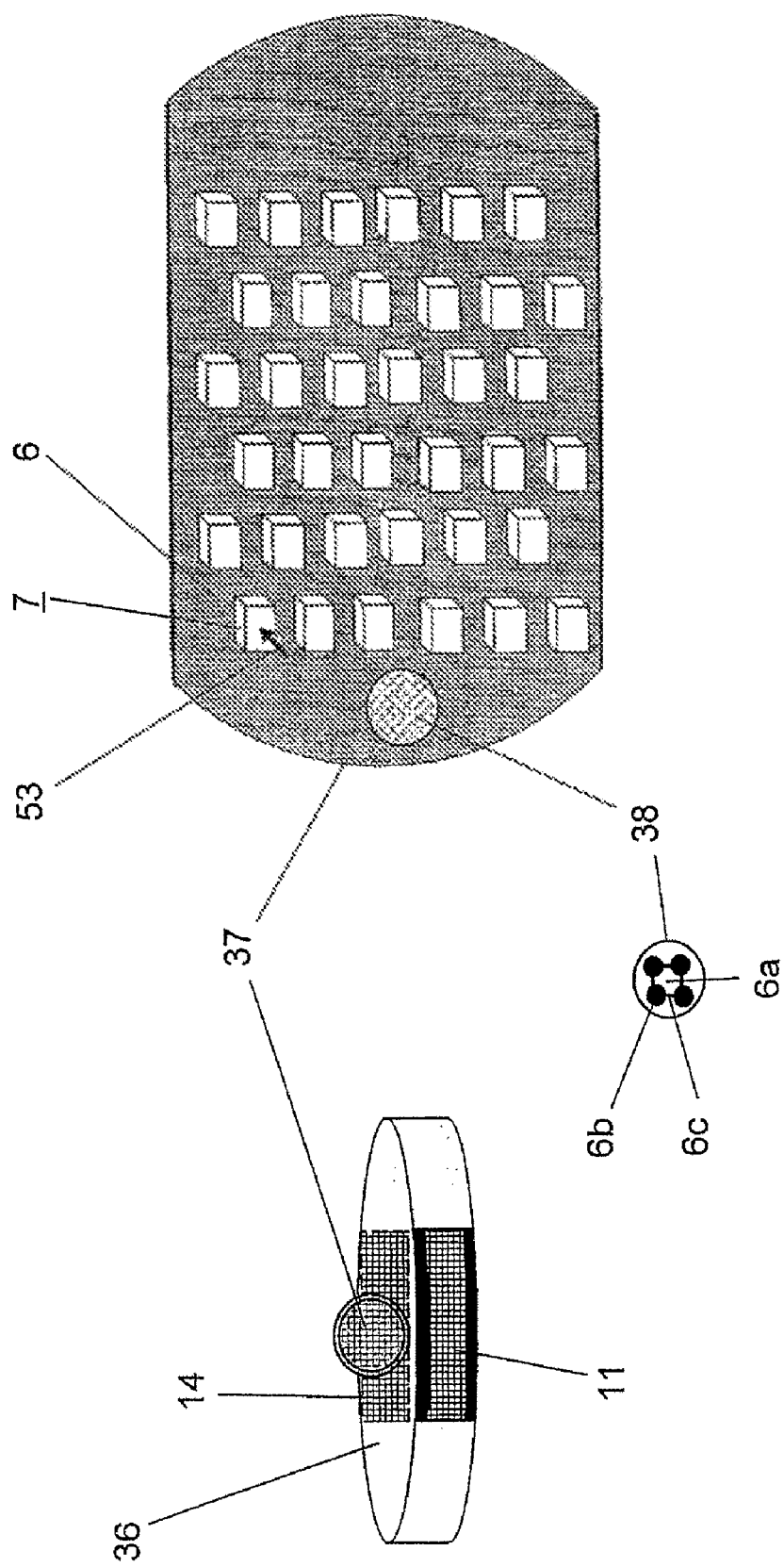

FIG. 6 shows, schematically, a module plate which contains the cathode chamber (7) and the electrolyte matrix (6) surrounding the cathode chamber, with the cathode chamber having a large number of channels. These pass through the electrolyte matrix (6). The channels passing through may have round, triangular, rectangular or square cross sections.

In detail, FIG. 6 shows the module plate (36) with an inlet (11) and an outlet (14). An enlargement (37) is located above the outlet (14). This shows the gas passages (7) to be seen in an enlarged form as an outer cathode chamber, through which the gas flow containing the carbon dioxide flows in the illustrated direction (53). The illustration with the enlargement (37) is shown such that the gas passages (7) are released from the electrolyte matrix (6) surrounding them, rise as columns from a contact surface, which has a thickness of only one layer, and at the same time forms the outlet side (14), opposite the inlet side (11). This layer is once again illustrated enlarged at enlargement (38). The enlargement at (38) shows the ceramic beads (6b) in the electrolyte matrix (6), which are connected to one another via the connection (6c), and the pore spaces (6a) which are filled with electrolyte.

The electrolyte enclosed in the electrolyte area (6a) of the electrolyte matrix (6) forms a connection with the outer wall of the cathode chamber (7) via the continuously connecting pore spaces, via which connection the electrolyte extracts the carbon dioxide from the gas mixture. At the same time, the pore spaces make a connection via the outer wall of the electrolyte area with the passage (8), which is not shown in any more detail.

Figure 7:
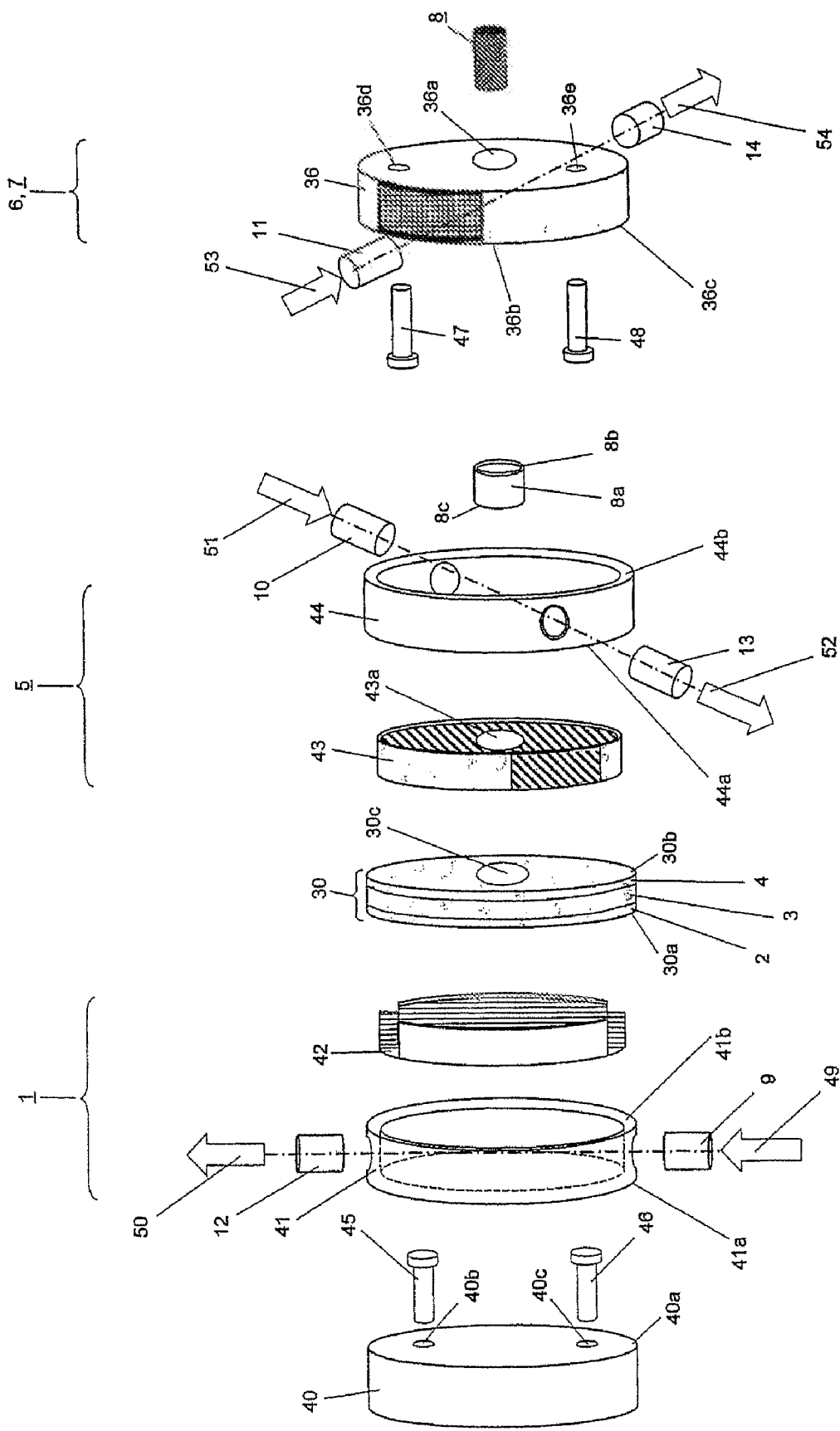

FIG. 7 shows, schematically, the composition of a complete fuel cell with the components according to the embodiment descriptions relating to FIGS. 4 to 6, as an exploded drawing.

In detail, FIG. 7 shows the anode chamber (1) with a cylindrical ring (41), which surrounds the functional unit (42), as well as a functional unit, a half capacitor (30) with electrodes (2) and (4) and an electrolyte matrix (3), the cathode chamber (5) with a cylindrical ring (44) surrounding the functional unit (43), as well as a functional unit, the cylindrical hollow body (8a), which is filled with electrolyte, for the passage (8), a module plate (36) and various supply lines and output lines (9), (12), (10), (13), (11) and (14), which are connected to the chamber inlets and outlets and through which the chambers are fed with fuel gas (49), air oxygen (51) and carbon dioxide (53), and through which the anode exhaust gas (50), the exhaust air (52) and the residual carbon dioxide (54) are carried away. The anode chamber (1) is closed by a blank plate (40). Furthermore, this shows the contact pins (45, 46, 47 and 48), which press the functional units (42, 43) against the anode and cathode electrodes (2, 4), and make the electrical contact. These pass through the blank plate (40) at the passages (40b) and (40c), and the electrolyte matrix (6) the outer cathode chamber (7), which are combined in the module plate (36) at the passages (36b) and (36e) and on the outside form the connecting points for further cells within a cell stack, as well as those for the external connection of a cell block.

The inlets and outlets (9) and (12) of the anode chamber are located adjacent to the cylindrical ring (41). The cylindrical ring (41) surrounds the functional unit (42) which is located in the interior of the anode chamber. The half capacitor (30) is passed to the end surface of the cylindrical ring (41) and is connected to it with a force fit via the coincident annular surfaces (41b) and (30a). The contact pins (45) and (46) in the blank plate (40) extend into the anode chamber (42). These pins press the functional unit (42) in the anode chamber (42) against the anode electrode (2), thus making an electrical contact between them. The connection between the end surface of the cylindrical ring (41) and the blank plate (40) is made between the annular surfaces (41a) and (40a), while the contact pins (45) and (46) are fixed in the passage holes (40b) and (40c).

The hollow cylinder (8a) with its annular end surface (8c) is mounted on the surface (30c) on the electrolyte matrix (3) of the half capacitor (30). The functional unit (43) of the central cathode chamber is placed with its passage (43a) over the hollow cylinder (8a), and is connected to the cathode electrode (4) of the half capacitor (30). The functional unit (43) is surrounded by the cylindrical ring (44) with its inlets and outlets (10) and (13). The end surface (8c) of the hollow cylinder (8a) and the end surface (44a) of the cylindrical ring (44) are connected to one another with a force fit by the coincident annular surfaces (30b) and (30c) of the half capacitor (30).

The central cathode chamber with the functional unit (43) located in it is closed by connecting the end surfaces (8b) and (44b) of the hollow cylinder (8a) and the annular cylinder (44) to one another by means of the annular surfaces (36b) and (36c) of the module plate (36). The functional unit (43) of the central cathode chamber is in this case pressed against the half capacitor (30) by means of the contact pins (47) and (48) which are fixed in the module plate (36) and extend into the central cathode area, thus making an electrical contact with the cathode electrode (4).

The module plate (36) is provided with a passage hole (36a) which provides access to the interior of the hollow cylinder (8a). The hollow cylinder (8a) is filled with electrolyte (8) through this passage hole. The filling process is ended and the passage hole closed as soon as the electrolyte has reached a height of about one half to two thirds of the thickness of the module body in the module plate (36).

Figure 8:
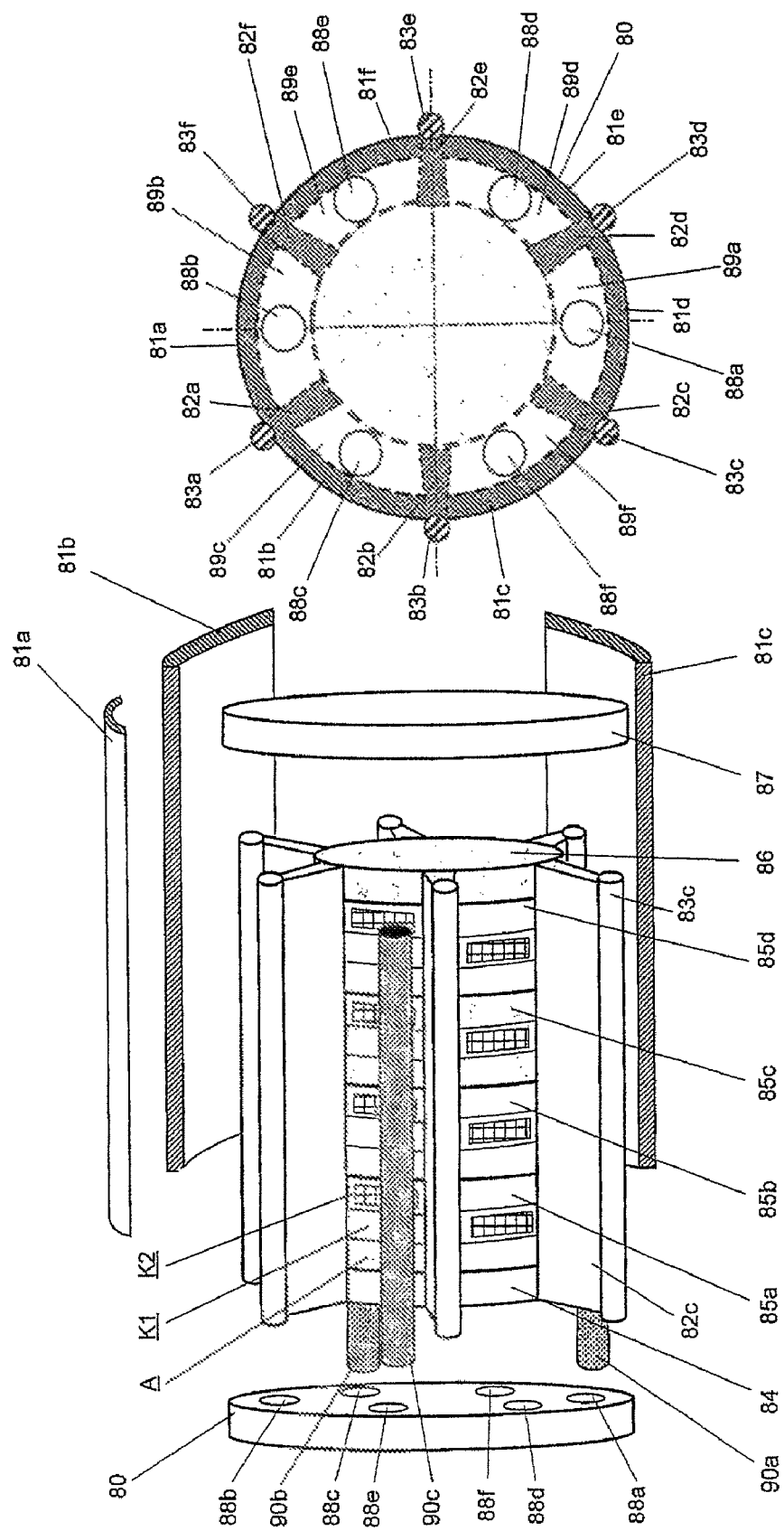

FIG. 8 shows a cylindrical cell stack which, in its interior, comprises four cells and forms a cell block by means of three-dimensional fittings. The left-hand part of the figure shows, schematically, the cell block as an exploded drawing horizontally, while the right-hand part of the figure shows a plan view of the geometric shape.

In detail, FIG. 8 shows the cell stack, which comprises four fuel cells (85a), (85b), (85c) and (85d) and which is closed at both ends by an isolator plate (84) and (86). The stack comprising cells and isolator plates is surrounded by a total of six fitted partitions (82a), (82b), (82c), (82d), (82e) and (82f). These are connected to one another with respect to the cells and the isolator plates by shell bodies (81a), (81b), (81c), (81d), (81e) and (81f) which are fixed to the partitions by means of the external cylindrical bodies (83a), (83b), (83c), (83d), (83e) and (83f). Furthermore, the partitions, the shell bodies and the isolator plates are connected at the end faces to the two cover plates (80) and (87), thus resulting in the attached spaces (89a), (89b), (89c), (89d), (89e) and (89f) as common supply lines and output lines. The spaces are accessible from the outside via the inlets (88a), (88b), (88c), (88d), (88e), and (88f). Furthermore, diffusors in the form of perforated tubes (90a), (90b) and (90c) are located in the spaces (89a), (89c) and (89e), are connected at one end to the hole passages (88a), (88c) and (88e) in the cover plate (80), and are closed at the other end.

The attached spaces (89a) to (89f) form nodes for the anode chamber (A), the central cathode chamber (K1) and the outer cathode chamber (K2). These nodes are connected to the inlets and the outlets of the cells in the cell stack, with the attached spaces resulting in the cells being connected in parallel. The inlet of the anode chamber (A) is therefore connected to the space (89a), the inlet of the central cathode chamber (K1) to the space (89e), the inlet of the outer cathode chamber (K2) to the space (89c), the outlet of the anode chamber (A) to the space (89b), the outlet of the central cathode chamber (K1) to the space (89f), and the outlet of the outlet cathode chamber (K2) to the space (89d).

The gas which is introduced into the spaces (89a), (89c) and (89e) is distributed uniformly between the inlets of the anode chamber (A), of the central cathode chamber (K1) and of the outer cathode chamber (K2) by previously using the perforation in the diffusors (90a), (90b) and (90c) to swirl the gas flows. The perforation is preferably directed towards the outer shell bodies (81d), (81b) and (81f), from which the gas flows are swirled in the direction of the inlet of the anode chamber (A), the inlet of the central cathode chamber (K1) and the inlet of the outer cathode chamber (K2), making the substance flow that is supplied uniform in the attached supply lines.

Figure 9:
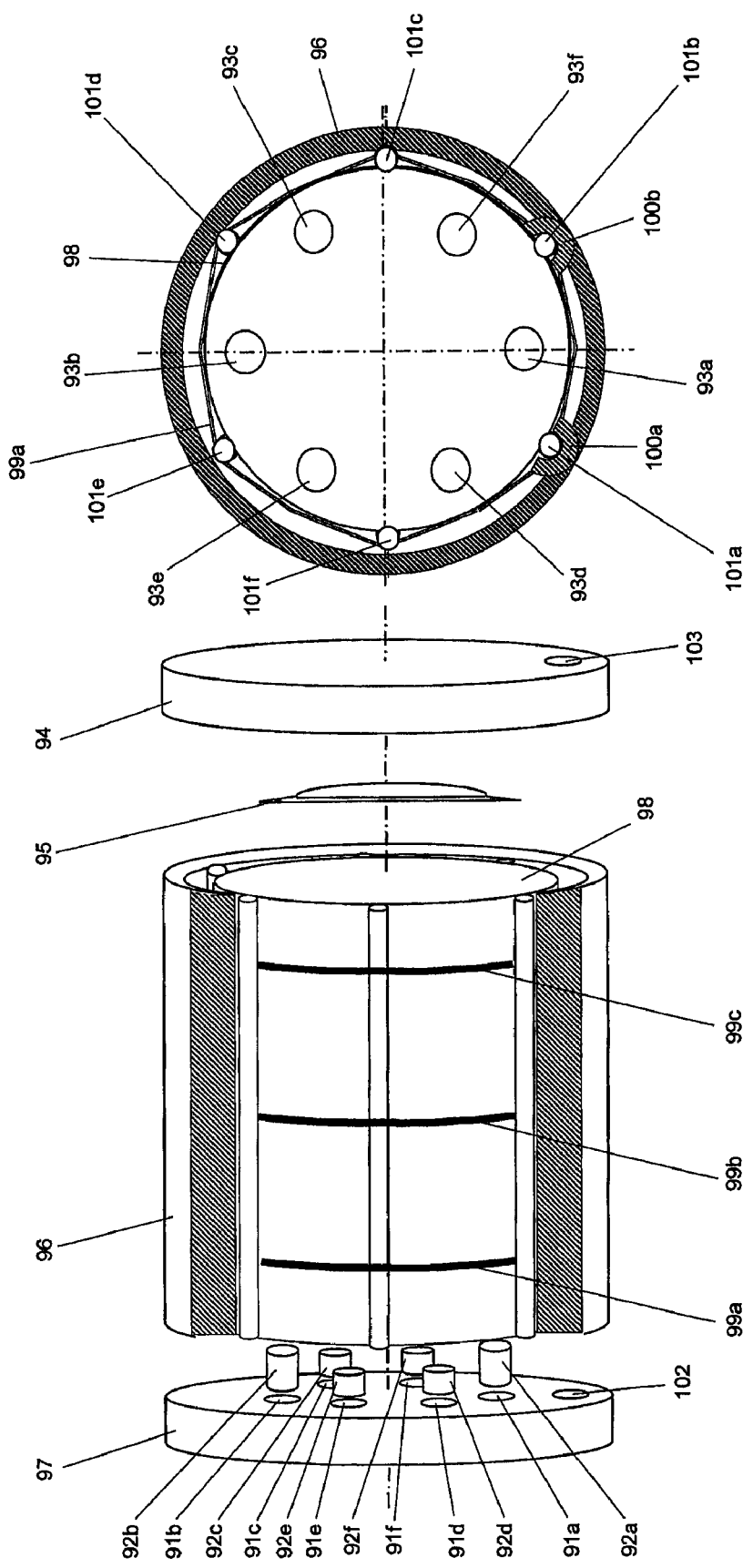

FIG. 9 shows the fuel cell ready to operate, housed in a cylindrical casing, with a cup spring fitted. The left-hand part of the figure schematically shows the cell block encased in the form of an exploded drawing horizontally, while the right-hand part of the figure shows a plan view of the geometric shape of the fuel cell together with the guide for the cell block within the casing.

In detail, FIG. 9 shows the cell block (98) and its housing. The housing comprises a base plate (94), the cylinder (96) surrounding the cell block (98), and the cover plate (97). The guide rails (100a) and (100b), on which the cell block (98) is separated by the cylindrical bodies (101a) and (101b), are located in the interior of the cylinder. At the same time, the two rails are used to allow thermal expansion of the cell block (98) in the axial direction. The three tightening strips (99a), (99b) and (99c) surround the cell block (98) with the cylindrical bodies (101a), (101b), (101c), (101d), (101e) and (101f) located in between. The tightening strips hold together the outer wall of the cell stack, which is composed of shells. The cell block (98) is compressed by the spring force of the cup spring from the base plate (94), with the cover plate (97) forming the stop for the cell block (98). The spring force of the cup spring clamps the cell stack (98) in the housing in the axial direction such that it has to convert the expansion movement to a spring load, and the expansion movement at the same time takes place on the guide rails (100a) and (100b), while the radial expansion movement of the cell block (98) is converted into a spring load in the tightening strips (99a), (99b) and (99c).

The supply lines and output lines (92a), (92b), (92c), (92d), (92e) and (92f) for the gas flows are firmly connected to the inlets and outlets (93a), (93b), (93c), (93d), (93e) and (93f) of the cell block (98), and lead from them through the passages (91a), (91b), (91c), (91d), (91e) and (91f) in the cover plate (97) out of the cylindrical body which surrounds the cell block (98), comprising the cylinder (96), the base plate (94) and the cover plate (97). The waste heat emitted from the cell block (98) is dissipated from its surface by the air flowing past. For this purpose, a respective inlet and outlet (102) and (103) are located in the base plate (94) and in the cover plate (97), by means of which the inner cell stack (98) is cooled on its outer wall by air.

FIG. 10 shows a fuel cell which is connected between a flue gas purification installation for a coal-fired power station and the chimney and which removes the carbon dioxide contained in the flue gas, liquefies it and transports it via a pipeline to a final store, while the flue gas from which the carbon dioxide has been removed passes through the chimney into the atmosphere.

In detail, FIG. 10 shows a coal-fired steam generator (110), a dust-extraction, sulfur-extraction and nitrogen-extraction installation (112), referred to for short in the following text as a 3E installation, a heat exchanger (114), a fuel cell (116), a chimney (119), a synthesis gas generator (122), a PSA installation (124), a compressor (128), a heat exchanger (130), a pressure vessel (132) and a pipeline (135).

The outer cathode chamber (2), the cathode 2 of the fuel cell (116), is connected by its inlet via the connections (111) and (113) to the 3E installation (112) and to the coal-fired steam generator (110), and is connected by its outlet via the connections (117) and (118) to the heat exchanger (114) and to the chimney (119). The flue gas, which contains carbon dioxide, from the steam generator (110) has the dust, sulfur and nitrogen oxides removed from it in the 3E installation (112) before entering the cathode chamber of the cathode 2 of the fuel cell (116). There, the carbon dioxide is depleted from the flue gas. The carbon-dioxide-depleted flue gas is passed via the outlet of the cathode chamber 2 and the connections that have been mentioned to the chimney, from where it is passed into the atmosphere, once a major proportion of the enthalpy contained in it has been extracted from it by the heat exchanger (114). The enthalpy transferred to the secondary surface is used to heat the carbon-dioxide-rich flue gas from the 3E installation in the heat exchanger (114) to such an extent that it reaches the permissible operating temperature for entering the cathode chamber of the cathode 2.

The inlet of the anode chamber of the fuel cell (116) is connected via the connections (126) and (123) to the PSA installation (124) and to the synthesis gas generator (122), and is connected via the connection (133) to the head area of the pressure vessel (132). Furthermore, the outlet of the anode chamber is connected via the connections (127), (129) and (131) to the compressor (128), to the heat exchanger (130) and to the pressure vessel (132).

In the PSA installation (124), the synthesis gas produced in the synthesis gas generator (122), and which comprises carbon monoxide and hydrogen, is selectively split into the components carbon monoxide and hydrogen. The hydrogen is passed via the connection (125) for a purpose which will not be described in any more detail, while the carbon monoxide is passed as fuel gas via the connection (126) into the anode chamber of the fuel cell (116), in which it is converted. The exhaust gas from the conversion process, comprising carbon dioxide and fuel gas leakage, leaves the anode chamber via its outlet and is compressed in the compressor (128) by pressure boosting above the critical value of the carbon dioxide, and is cooled down in the heat exchanger (130) to such an extent that the carbon dioxide is liquefied, and is then temporarily stored in the pressure vessel (132).

The secondary circuit of the heat exchanger (130) is connected via the connection (136) to a waterway (137). The enthalpy extracted from the primary circuit of the heat exchanger (128) is carried away via this connection.

The pressure vessel (132) has one inlet and two outlets. A liquid column of height (h1) is produced in its interior, which rises from the bottom area and is composed of carbon dioxide. Substances which have not been liquefied, and cannot be liquefied, are located above this column. There is a transitional zone of height (X1) composed of liquid and gaseous substances between the two aggregate states of "liquid and gaseous". The height of the inlet is therefore chosen such that the carbon dioxide supplied in liquid form enters the liquid column, to be precise considerably below the height (h1), and the non-liquefied substances rise as gas bubbles within the liquid column to the surface. The mixture comprising predominantly carbon monoxide as well as just residues of carbon dioxide is extracted from the pressure vessel via the outlet at the top, and is fed via the connection (133) into the anode chamber of the fuel cell (116), in which the carbon monoxide is converted. Liquid carbon dioxide is drawn off continuously via the outlet at the bottom, and is carried away via the connection (134) to a pipeline (135), which will not be described in any more detail.

The inlet of the cathode chamber 1 of the fuel cell (116) is connected to the connection (120), and its outlet is connected to the connection (121). The fuel cell is fed with air oxygen via the inlet, for conversion in the anode chamber, while the air, depleted of oxygen, leaves the cathode chamber via the connection (121).

FIG. 11 shows a fuel cell which is connected between an oxygen source and a chimney and in which the oxygen is used on the one hand for the conversion process and on the other hand for cooling the fuel cell, while the air, depleted of oxygen, is passed via the chimney into the atmosphere.

In detail, FIG. 11 shows a fuel cell (145), a PSA installation (141) as an oxygen source, an adsorption drier (143) for drying the moist air, various heat exchangers (150), (153), (157) and (159), a fan (148) and a chimney (155) for the exhaust air.

The central cathode chamber, the cathode 1 of the fuel cell (145), is connected by its inlet via the connections (144), (142), (140) and (151) to the adsorption drier (143), to the PSA installation (141) and to the heat exchanger (150), while the inlet of the PSA installation is connected to the atmosphere. The cathode chamber outlet is connected from the cathode 1 of the fuel cell (145) via the connections (146), (147), (149), (152) and (154) to the heat exchanger (150) and (153), to the fan (148) and to the chimney (119). The outlet of the cathode chamber is connected from the cathode 1 to the atmosphere via this chimney (119).

The PSA installation (141) is fed via the connection (140) with air oxygen from the atmosphere, which is broken down by the pressure-changing process selectively into oxygen and nitrogen. While the nitrogen is supplied via the connection (164) for a purpose which will not be described in any more detail, the oxygen that is obtained is supplied to the adsorption drier (143) via the connection (142), and is dried in it, before being passed to the cathode chamber of the cathode 1 of the fuel cell (145), where the oxygen is depleted for conversion of fuel gas in the anode chamber. A proportion of the air gas mixture from which oxygen has been depleted is passed via the outlet of the cathode chamber from the cathode 1 and the connections mentioned above as exhaust air to the chimney (155), from which it is passed into the atmosphere. A considerable proportion of the enthalpy contained in the exhaust air is extracted from it prior to this in the heat exchanger (153). The enthalpy transferred to the secondary circuit is fed via the connection (161) to a steam heater (157).

The cooling circuit for the fuel cell (145) starts and ends at the outlet from the cathode chamber of the cathode 1, and is connected via the connections (146), (147), (149) and (151) as well as the fan (148) which is connected in series with the heat exchanger (150), to the inlet of the cathode chamber. The air oxygen is circulated as a coolant through this circuit. The waste heat produced in the cathode chamber is absorbed by the air flow, is carried out of the cathode chamber, and is then extracted from the air flow in the heat exchanger (150). A steam heater (159) is fed via the connection (161) with the enthalpy transferred to the secondary circuit. The air oxygen, as the coolant, is driven by the fan (148).

The enthalpy emitted from the heat exchangers (150) and (153) is absorbed by the heat exchangers (157) and (159), which are connected in series with one another via the connection (158). The heat exchanger (157) is fed with boiler feed water via the connection (156). This water is heated in the two heat exchangers (157) and (159) such that it leaves the heat exchanger (159) via the connection (162) as fresh steam.

The adsorption drier (143) is not operated continuously. This means that at least two twin containers are required for a continuous process which are operated alternately in the "adsorption" and "regeneration" operating modes. In the "regeneration" operating mode, the relevant container is purged with both dry and hot nitrogen, which is supplied via the connection (163*a*) and is carried away desorptively together with the nitrogen via the connection (163*b*). The container, which is at the same time freed from regeneration, extracts the moisture entering it from the air by adsorption.

FIG. 12 shows a fuel cell at a natural gas storage facility, which extracts the carbon dioxide from the natural gas being conveyed and feeds the purified natural gas into a pipeline, which transports the natural gas to the consumers, while the carbon dioxide that has been liquefied from the natural gas is transported via a second pipeline to a cavern, where it is finally stored.

In detail, FIG. 12 shows a natural gas storage facility (165) having a feed tower (167), which is arranged on it and which is followed by a sulfur-extraction installation (169), an adsorption drier (171), a heat exchanger (173), a fuel cell (175), a synthesis gas generator (182), a PSA installation (184), a compressor (188), a heat exchanger (190), a pressure vessel (192) and two pipelines (178) and (195).

The outer cathode chamber, the cathode 2 of the fuel cell (175), is connected by its inlet via the connections (166), (168), (170), (172) and (174) to the adsorption drier (171), to the sulfur-extraction installation (169), to the feed tower (167) and to the natural gas storage facility (165), and is connected by its outlet via the connections (176) and (177) to the heat exchanger (173) and to the natural gas pipeline (178), as well as via the connection (181) to the synthesis gas generator (182). The natural gas, containing carbon dioxide, from the natural gas storage facility (166) is fed above ground through the feed tower (167), has the sulfur removed from it in the sulfur-extraction installation (169) and is dried in the adsorption drier (171) in order to provide corrosion protection for the pipeline (178), and for subsequent sales purposes, before being passed into the cathode chamber of the cathode 2 of the fuel cell (175), where the carbon dioxide is extracted from the natural gas. A proportion of the amount of natural gas from which the carbon dioxide has been depleted is emitted from the outlet of the cathode chamber from the cathode 2 and is supplied as the product via the connection (181) to the synthesis gas generator (182). The majority is passed via the connections that are shown to the pipeline (178), through which the natural gas is passed to the consumers, although these are not depicted in any more detail, once a considerable proportion of the enthalpy contained in the natural gas has been extracted from it prior to this, by the heat exchanger (173). The enthalpy transferred to the secondary circuit is used to heat the natural gas, which contains carbon dioxide, from the adsorption drier (171) to such an extent that it reaches the permissible operating temperature for entering the cathode chamber of the cathode 2.

The adsorption drier (171) is not operated continuously. This means that at least two twin containers are required for a continuous process, which are operated alternately in the "adsorption" and "regeneration" operating modes. In the "regeneration" operating mode, the relevant adsorption container is purged with both dry and hot nitrogen, which is supplied via the connection (198) and is carried away desorptively together with the nitrogen via the connection (199). The container, which is at the same time freed from regeneration, extracts the moisture contained in the natural gas from it by adsorption.

The anode chamber of the fuel cell (175) is connected by its inlet via the connections (183) and (185) to the PSA installation (185) and to the synthesis gas generator (182), and is connected via the connection (193) to the head area of the pressure vessel (192). Furthermore, the outlet of the anode chamber is connected via the connections (187), (189) and (191) to the compressor (188), to the heat exchanger (190) and to the pressure vessel (192).

The synthesis gas which has been produced in the synthesis gas generator (182) and comprises carbon monoxide and hydrogen is selectively split in the PSA installation (184) into the components carbon monoxide and hydrogen. The hydrogen is supplied via the connection (185) for a purpose which will not be described in any more detail, while the carbon monoxide is passed as fuel gas via the connection (186) to the anode chamber of the fuel cell (175), in which it is converted. The exhaust gas from the conversion process, which comprises carbon dioxide and fuel gas leakage, leaves the anode chamber via its outlet, and is compressed above the critical value of the carbon dioxide by pressure boosting in the compressor (188), and is cooled down in the heat exchanger (190) to such an extent that the carbon dioxide is liquefied, and can then be temporarily stored in the pressure vessel (192).

The secondary circuit of the heat exchanger (190) is connected via the connection (196) to a waterway (197), as a heat sink. The enthalpy extracted from the primary circuit of the heat exchanger (188) is carried away via this connection.

The pressure vessel (192) has one inlet and two outlets. A liquid column of height (h2) is produced in its interior, which rises from the bottom area and is composed of carbon dioxide. Substances which have not been liquefied, and cannot be liquefied, are located above this column. There is a transitional zone of height (X2) composed of liquid and gaseous substances between the two aggregate states of "liquid and gaseous". The height of the inlet is therefore chosen such that the carbon dioxide supplied in liquid form enters the liquid column, to be precise considerably below the height (h2), and the non-liquefied substances rise as gas bubbles within the liquid column to the surface. The mixture comprising predominantly carbon monoxide as well as just residues of carbon dioxide is extracted from the pressure vessel via the outlet at the top, and is fed via the connection (193) into the anode chamber of the fuel cell (175), in which the carbon monoxide is converted. Liquid carbon dioxide is drawn off continuously via the outlet at the bottom, and is carried away via the connection (194) to a pipeline (195), which will not be described in any more detail, which is connected to a final storage facility, which is not illustrated in any more detail, but in which the carbon dioxide is finally stored.

The inlet of the central cathode chamber, the cathode 1 of the fuel cell (175), is connected to the connection (179), and its outlet is connected to the connection (180). The fuel cell is supplied with air oxygen via the inlet for the conversion in the anode chamber, while the exhaust air, depleted of oxygen, leaves the cathode chamber via its outlet.

FIG. 13 shows a vapor-deposition process, in which an electrolyte matrix is coated with a gas-permeable anode electrode.

In detail, FIG. 13 shows a recipient (200) with the two chambers (201) and (202), a substrate holder (203), a vaporizer source (204), a power source (210), a vacuum pump and the electrolyte matrix (3) as the outlet for the chamber (202) and as the inlet for the chamber (201).

The electrolyte matrix (3) is connected to a substrate holder (203), and splits the recipient (200) into the chambers (201) and (202). The chamber (202) is fed with purging gas via the inlet (209). The purging gas leaves the chamber (202) by flowing through the pores of the electrolyte matrix (3) into the chamber (201). The purging gas leaves the chamber (201) there via the outlet (208). The outlet is connected via the connection (208) to the input of a vacuum pump (212), which sets a vacuum pressure of between $10^{-3}$ and $10^{-4}$ Pa in the chamber (201). The output of the vacuum pump (212) is connected via the connection (213) to the inlet (209) of the chamber (202), via which the purging gas is circulated.

The vaporizer source (214) is connected via the connections (205) and (206) to the power source (210), via which the vaporizer source is fed with power, with the connection (205) passing through a vacuum lock (206).

The material to be vaporized rests on the vaporizer source (204) and is heated by the vaporizer source (204) to such an extent that it is vaporized. The vaporized material rises as vapor (215) and is precipitated on the electrolyte matrix (3) as the anode electrode (2). The purging gas flow means that no precipitation occurs at the pore outlets of the electrolyte matrix (3), through which the purging gas flows.

FIG. 14 shows a sputtering process, in which an electrolyte matrix is coated with a gas-permeable anode electrode.

In detail, FIG. 14 shows a recipient (220) with the two chambers (221) and (222), a substrate holder (234), an anode (223), a target cathode (224), a vacuum pump (230) as well as the electrolyte matrix (3) as the outlet of the chamber (222) and as the inlet of the chamber (221).

The electrolyte matrix (3) is connected to a substrate holder (234) and splits the recipient (220) into the chambers (221) and (222). The chamber (221) is purged with process gas, as a purging gas, via the inlet (224) before the start of the process, and the air that is present is displaced from the chamber (221), by the air and the purging gas leaving the chamber (221) via the outlet (225). The chamber (222) is likewise purged with purging gas in the same way. For this purpose, the purging gas is fed in via the inlet (226), and is carried away via the outlet (227) together with the air that is present.

Once the process of purging by means of the purging gas has been completed, the inlet (240) and the outlet (227) are closed, and the chamber (221) is evacuated by the vacuum pump (230) down to a value of a few tenths of a Pascal, up to about 15 Pa. For this purpose, the input of the vacuum pump is connected via the connection (229) to the outlet (225), via which the chamber (221) is emptied. The output of the vacuum pump (230) is connected to the connection (231), via which process gas is carried away. At the same time, the chamber (222) is fed with argon, as the process gas, through the connection (236) via its inlet (226). This process gas flows from the chamber (222) through the pores of the electrolyte matrix (3) and fills the chamber (221), with precisely the same amount of process gas being carried away via the outlet (225).

During this process, the target cathode (224) is connected via the connection (233) to the negative pole, and the anode (223) is connected via the connection (232) to the positive pole, of an electrical power source, with the anode (223) being gas-permeable and resting on the electrolyte matrix (3). The positively charged argon ions are accelerated towards the negative target cathode (224) and displace atoms (239) from the surface. The atoms are displaced by impulse transfer. In addition to the atoms that have been displaced, the ion bombardment results in a number of other interaction products, such as secondary electrons and ions, X-ray radiation and photons. The secondary ions ionize neutral argon atoms to form $Ar^+$, and thus ensure that the plasma (235) is maintained, and is precipitated as vapor (237) on the electrolyte matrix (3), with the pores of the electrolyte matrix (3) remaining free, because of the process gas flowing through in the direction of the chamber (221), and forming a gas-permeable anode electrode (2).

LIST OF REFERENCE SYMBOLS

FIG. 1

No. Designations
1 Anode chamber
2 Anode electrode
2a Current collector for the anode electrode
2b Electrical connection between the anode electrode and the current collector
3 Electrolyte matrix
4 Cathode electrode
4a Current collector for the cathode electrode
4b Electrical connection between the cathode electrode and the current collector
5 Central cathode chamber
6 Electrolyte matrix
7 Outer cathode chamber
8 Electrolyte channel
9 Anode chamber inlet
10 Central cathode chamber inlet
11 Outer cathode chamber inlet
12 Anode chamber outlet
13 Central cathode chamber outlet
14 Outer cathode chamber outlet
15 Electrical connection between the anode electrode and a resistor
16 Electrical connection between the resistor and the cathode electrode
17 Resistor
18 Current flow to the resistor
19 Current flow from the resistor

LIST OF REFERENCE SYMBOLS

FIG. 2

No. Designations
20 Anode electrode
20a Anode electrode connection
21 Electrolyte 22 Cathode electrode
22a Cathode electrode connection
E Electrical field

LIST OF REFERENCE SYMBOLS

FIG. 3

No. Designations
2 Anode electrode
2c Anode capacitor plate connection
2d Inlet
2e Porous anode capacitor plate
3 Electrolyte matrix
3c Electrolyte
4 Cathode electrode
4c Cathode electrode connection
4g Cathode capacitor plate as metal sponge
E Electrical field

LIST OF REFERENCE SYMBOLS

FIG. 4

No. Designations
2 Anode electrode
2d Passage
3 Electrolyte matrix
3a Ceramic bead
3b Connection between the ceramic beads
3c Electrolyte
3d Electrolyte area
4 Cathode electrode
4c Cathode electrode
4d Metal bead
4e Connection between the metal beads
4f Electrolyte area
4g Porous cathode capacitor plate
23 Enlargement
24 Enlargement
25 Enlargement
26 Enlargement
27 Enlargement

LIST OF REFERENCE SYMBOLS

FIG. 5

No. Designations
2 Anode electrode
2a Current collector for the anode electrode
2b Triangular profile (31), gas-permeable metal sheet (2c) and porous anode capacitor plate (2e)
2c Gas-permeable metal sheet
2e Anode capacitor plate
3 Electrolyte matrix
4 Cathode electrode
4a Current collector for the cathode electrode
4b Triangular profile (32) and gas-permeable metal sheet (4c)
4c Gas-permeable metal sheet
30 Half capacitor
31 Triangular profile
32 Triangular profile
32a Half limb length
32b Half limb length
32c Limb length (32a) folded outwards
32d Limb length (32b) folded outwards
32e Weld bead
33a Folded-over area from (32a) to (32c)
33b Folded-over area from (32b) to (32d)
33c Separation of the limb into the halves (32c) and (32d)
34 Opening in the perforated metal sheet (34)
35 Enlargement
42 Functional unit in the anode chamber (1)
43 Functional unit in the cathode chamber (5)
F1 Contact force for the anode current collector
F2 Contact force for the cathode current collector

LIST OF REFERENCE SYMBOLS

FIG. 6

No. Designations
6 Electrolyte matrix
6a Electrolyte area
6b Ceramic bead
6c Connection between the ceramic beads
7 Outer cathode chamber
11 Outer cathode chamber inlet
14 Outer cathode chamber outlet
36 Module plate, comprising: Electrolyte matrix (6) and the outer cathode chamber (7)
37 Enlargement
38 Enlargement
53 Gas mixture containing carbon dioxide

LIST OF REFERENCE SYMBOLS

FIG. 7

No. Designations
1 Anode chamber
2 Anode electrode
3 Electrolyte matrix
4 Cathode electrode
5 Central cathode chamber
6 Electrolyte matrix
7 Outer cathode chamber
8 Electrolyte channel and electrolyte deposit
8a Electrolyte
9 Supply line to the anode chamber inlet
10 Supply line to the central cathode chamber inlet
11 Supply line to the outer cathode chamber inlet
12 Output line from the anode chamber outlet
13 Output line from the central cathode chamber outlet
14 Output line from the outer cathode chamber outlet
30 Half capacitor
30a Outer circular surface as an adhesive-bonding surface for the mating surface (41b)
30b Outer circular surface as an adhesive-bonding surface for the mating surface (44a)
30c Connecting point provided for the electrolyte channel (8) with a surrounding annular surface as an adhesive-bonding point for the hollow cylinder (8a) with its outer cylindrical annular surface (8c)
36 Module plate, comprising: electrolyte matrix (6) and cathode chamber (7)
36a Passage for filling the cylindrical hollow body (8a) with electrolyte (8)

No. Designations
36b Inner annular surface as an adhesive-bonding surface for the cylindrical hollow body (8a)
36c Outer annular surface as an adhesive-bonding surface for the cylindrical annular surface (44b)
36d Passage for contact pin 47
36e Passage for contact pin 48
40 Blank plate
40a Annular surface as an adhesive-bonding surface for the cylindrical annular surface (41a)
40b Passage for contact pin (45)
40c Passage for contact pin (46)
41 Cylindrical ring surrounding the anode chamber (1)
41a Outer cylindrical annular surface as an adhesive-bonding surface for the mating surface (40a)
41b Outer cylindrical annular surface as an adhesive-bonding surface for the mating surface (30a)
42 Functional unit for the anode chamber (1), comprising: current collector (2a), triangular profile (31), gas-permeable metal sheet (2c) and anode capacitor plate (2e)
43 Functional unit for the cathode chamber (5), comprising: current collector (4a), triangular profile (32) and gas-permeable metal sheet (4c)
43a Passage through the connecting module (43) for the electrolyte channel (8)
44 Cylindrical ring surrounding the central cathode chamber (5)

No. Designations
44a Cylindrical annular surface as an adhesive-bonding surface for the outer circular surface (30b)
44b Cylindrical annular surface as an adhesive-bonding surface for the outer circular surface (36c)
45 Contact pin
46 Contact pin
47 Contact pin
48 Contact pin
49 Anode fuel gas
50 Anode exhaust gas
51 Cathode-air-oxygen
52 Cathode exhaust air
53 Gas mixture containing carbon dioxide
54 Gas mixture containing carbon dioxide with residual carbon-dioxide content

LIST OF REFERENCE SYMBOLS

FIG. 8

No. Designations
80 Cover plate
81a Shell body
81b Shell body
81c Shell body
81d Shell body
81e Shell body
81f Shell body
82a Partition
82b Partition
82c Partition
82d Partition
82e Partition
82f Partition
83a Cylindrical body
83b Cylindrical body
83c Cylindrical body
83d Cylindrical body
83e Cylindrical body
83f Cylindrical body
84 Isolator plate
85a Fuel cell
85b Fuel cell
85c Fuel cell
85d Fuel cell
86 Isolator plate
87 Cover plate
88a Inlet
88b Outlet
88c Inlet
88d Outlet
88e Inlet
88f Outlet
89a Attached area
89b Attached area
89c Attached area
89d Attached area
89e Attached area
89f Attached area No. Designations
90a Diffusor
90b Diffusor
90c Diffusor
A Anode chamber of the fuel cell
K1 Central cathode chamber of the fuel cell
Outer cathode chamber of the fuel cell

LIST OF REFERENCE SYMBOLS

FIG. 9

No. Designations
91a Passage
91b Passage
91c Passage
91d Passage
91e Passage
91f Passage
92a Supply line
92b Output line
92c Supply line
92d Output line
92e Supply line
92f Output line
93a Inlet
93b Outlet
93c Inlet
93d Outlet
93e Inlet
93f Outlet
94 Base plate
95 Cup spring
96 Cylinder surrounding the cell block
97 Cover plate
98 Cell block
99a Tightening strip
99b Tightening strip
99c Tightening strip
100a Guide rail
100b Guide rail
101a Cylindrical body
101b Cylindrical body
101c Cylindrical body
101d Cylindrical body 101e Cylindrical body
101f Cylindrical body
102 Inlet
103 Outlet

LIST OF REFERENCE SYMBOLS

FIG. 10

No. Designations
110 Coal-fired steam generator
111 Connection
112 Dust-extraction, sulfur-extraction and nitrogen-extraction installation, 3E installation for short
113 Connection
114 Heat exchanger
115 Connection
116 Fuel cell
117 Connection
118 Connection
119 Chimney
120 Connection
121 Connection
122 Synthesis gas generator
123 Connection
124 PSA installation
125 Hydrogen output line
126 Connection
127 Connection
128 Compressor
129 Connection
130 Heat exchanger
131 Connection
132 Pressure vessel
133 Connection
134 Connection
135 Pipeline
136 Connection
137 Waterway
h1 Height of the carbon dioxide liquid column
X1 Transition zone

LIST OF REFERENCE SYMBOLS

FIG. 11

No. Designations
140 Connection
141 PSA installation
142 Connection
143 Adsorption drier
144 Connection
145 Fuel cell
146 Connection
147 Connection
148 Fan
149 Connection
150 Heat exchanger
151 Connection
152 Connection
153 Heat exchanger
154 Connection
155 Chimney
156 Connection
157 Heat exchanger
158 Connection 159 Heat exchanger
160 Connection
161 Connection
162 Connection
163a Connection
163b Connection
164 Connection

LIST OF REFERENCE SYMBOLS

FIG. 12

No. Designations
165 Natural gas storage facility
166 Connection
167 Feed tower
168 Connection
169 Sulfur-extraction installation
170 Connection
171 Adsorption drier
172 Connection
173 Heat exchanger
174 Connection
175 Fuel cell
176 Connection
177 Connection
178 Natural gas pipeline
179 Connection
180 Connection
181 Connection
182 Synthesis gas generator
183 Connection
184 PSA installation
185 Hydrogen output line
186 Connection
187 Connection
188 Compressor
189 Connection
190 Heat exchanger
191 Connection
192 Pressure vessel
193 Connection
194 Connection
195 Carbon dioxide pipeline
196 Connection
197 Waterway
h2 Carbon dioxide liquid column
X2 Transition zone

LIST OF REFERENCE SYMBOLS

FIG. 13

No. Designations
2 Anode electrode
3 Electrolyte matrix
200 Recipient
201 Chamber
202 Chamber
203 Substrate holder
204 Vaporizer source
205 Connection
206 Vacuum lock
207 Connection
208 Outlet
209 Inlet 210 Power source
211 Connection
212 Vacuum pump
213 Connection
214 Vaporization material
215 Material vapor

LIST OF REFERENCE SYMBOLS

FIG. 14

No. Designations
2 Anode electrode
3 Electrolyte matrix
220 Recipient
221 Chamber
222 Chamber
223 Anode
224 Target cathode
225 Outlet
226 Inlet
227 Outlet
228 Connection
229 Connection
230 Vacuum pump
231 Connection
232 Connection
233 Connection
234 Substrate holder
235 Plasma
236 Connection
237 Material vapor
238 Argon ion
239 Atom forced out of the target cathode
240 Outlet

The invention claimed is:

1. A molten carbonate fuel cell having an anode chamber, cathode chambers, and electrolyte area, supply lines for fuel gas and an output line for the resultant carbon dioxide and water on the anode chamber and supply lines for oxygen and carbon dioxide on the cathode chambers and output line for air oxygen and for substances containing carbon dioxide, characterized by the following features:
   a) the fuel cell is subdivided into an outer cathode chamber and a central cathode chamber,
   b) two separate electrolyte areas are arranged between the anode chamber and the central cathode chamber, as well as between the central and the outer cathode chambers, with
   c) an electrolyte channel passing through the central cathode chamber and/or the wall of the central cathode chamber, and
   d) the supply lines and output lines for oxygen being arranged on the central cathode chamber, and the supply lines and output lines for carbon dioxide being arranged on the outer cathode chamber,
   e) with the anode chamber and the central cathode chamber holding a metal sponge and/or a functional unit, and with the outer cathode chamber holding a metal and/or ceramic sponge or a module plate.

2. The molten carbonate fuel cell as claimed in claim 1, wherein a mixture of carbon-dioxide gas and further gas constituents can be supplied via the supply line to the outer cathode chamber.

3. The molten carbonate fuel cell as claimed in claim 1, wherein, the gases circulate between the supply line and output line on the outer cathode chamber and the supply line and output line of the anode chamber.

4. The molten carbonate fuel cell as claimed in claim 1, wherein the electrolyte area between the anode chamber and the central cathode chamber comprises a layer body formed from three layers, with the first layer being a gas-permeable anode electrode, the second layer being an electrolyte matrix and the third layer being a porous cathode electrode, which together form an ionically conductive half capacitor, in which
   a) the anode electrode is the positive pole and the cathode electrode is the negative pole, and
   b) the anode electrode is composed of nickel which is interrupted by passages through which the pores of the electrolyte matrix are exposed, and connects the electrolyte enclosed in the pores to the edges of the passages, and
   c) the porous cathode electrode is composed of nickel oxide, through which electrolyte from the electrolyte matrix passes.

5. The molten carbonate fuel cell as claimed in claim 1, wherein
   a) the anode chamber has a functional unit which is bounded on the side facing the anode electrode by a porous capacitor plate and, on the opposite side, by a current collector, and in between them, a profiled body is pressed against a gas-permeable metal layer, which rests on the rear face of the capacitor plate and connects the latter to the anode electrode, and
   b) the central cathode chamber has a functional unit which is bounded on the side facing the electrode by a gas-permeable metal layer and, on the opposite side, by a current collector plate and in between them, a profiled body connects the current collector plate to the metal layer, and
   c) a contact pin and a spring is fitted between the anode electrode and an opposite wall of the anode chamber as well as between the cathode electrode and an opposite wall of the cathode chamber, by means of which the current collector plates and are kept in contact with the anode electrode and cathode electrode.

6. The molten carbonate fuel cell as claimed in claim 1, wherein a cylindrical ring surrounds the functional unit of the anode chamber and central cathode chamber, is closed at its end faces by an anode electrode and a cathode electrode, and a cover and a module plate and absorbs the force acting on a closure surface of the anode chamber and central cathode chamber, introduces this force into the annular surface of the cylindrical ring and adsorbs it in the cylindrical ring body, with the cylindrical ring being composed of metal or ceramic and being connected to its closures by an adhesive.

7. The molten carbonate fuel cell as claimed in claim 1, wherein a module plate combines an electrolyte matrix and the outer cathode chamber, and the electrolyte matrix surrounds the outer cathode chamber, with the porous body of the electrolyte matrix having pore spaces through which electrolyte passes.

8. The molten carbonate fuel cell as claimed in claim 1, wherein the electrolyte channel is filled with electrolyte through an opening in a module plate, and the electrolyte located in a melt feeds the electrolyte matrix and therewith.

9. The molten carbonate fuel cell as claimed in claim 1, wherein two or more fuel cells are connected in series by connecting the electrical connection between the current collector of the first fuel cell to the current collector of the second fuel cell, with the connection being made by a contact pin, which passes through a module plate, and whose projection brings the current collectors into contact, and provides metallic adhesion between them.

10. The molten carbonate fuel cell as claimed in claim 1, wherein connections for inlets and outlets of the fuel cell, and supply lines and output lines are fitted around the fuel cell.

11. The molten carbonate fuel cell as claimed in claim 1, wherein a plurality of fuel cells, which are in layers to form a stack, are connected to form a fuel cell block by the spaces fitted for inlets and outlets forming a parallel circuit, and by diffusers being installed in the spaces fitted for the supply lines.

12. The molten carbonate fuel cell as claimed in claim 11, wherein a container surrounds the fuel cell block, with the container being provided with openings through which the supply lines and output lines of the fuel cell block pass, and with further openings being provided in the container, through which the fuel cell block is cooled by means of a cooling medium flowing through it.

13. The molten carbonate fuel cell as claimed in claim 1, wherein a fuel cell and a fuel cell block are held together by a cup spring, by the cup spring pressing the fuel cell and the fuel cell block against a stop.

14. A method for depleting carbon dioxide from gas mixtures containing carbon dioxide, wherein the gas mixtures containing combustible gases are supplied to the outer cathode chamber of a molten carbonate fuel cell as claimed in claim 1.

15. The method for operating a molten carbonate fuel cell as claimed in claim 14, wherein the anode chamber is fed with carbon monoxide from a synthesis gas process in the absence of hydrogen, and a gas separating process is located between the synthesis gas process and an inlet of the fuel cell, which gas separating process removes the hydrogen from a mixed gas from the synthesis gas process, supplies, via a connection, the gas containing carbon monoxide to the fuel cell, and supplies, via a connection, the hydrogen to a process that uses hydrogen.

16. The method as claimed in claim 14, wherein the central cathode chamber is fed with a gas containing oxygen via its inlet in the absence of carbon dioxide.

17. The method as claimed in claim 14, wherein the central cathode chamber is operated in the absence of moisture and, for this purpose, an inlet of the central cathode chamber is connected via a connection to a drier, in which air oxygen is dried before entering the cathode chamber.

18. The method as claimed in claim 14, wherein the central cathode chamber together with a series-connected fan and a heat exchanger are short-circuited via their inlet and outlet, and a circulating gas is carried as a cooling medium in the short circuit, with the short circuit being continuously fed via a supply line with air oxygen from an oxygen-enrichment installation and with the air which has been depleted of oxygen in the central cathode chamber being thermally depleted via an output line in a heat exchanger connected upstream of the atmosphere, and with a heating process being fed with the thermal waste heat from the two heat exchangers.

19. The method as claimed in claim 14, wherein an outlet of the anode chamber is connected to a pressure-increasing, a cooling and a storage process for liquefying carbon dioxide, by means of which, with a gas mixture leaving the outlet of the anode chamber comprising fuel gas leakage and carbon dioxide, the carbon dioxide is separated from unconverted fuel gas and the liquid carbon dioxide is extracted continuously via an output line in a bottom area of a reservoir, while the fuel gas flows back via a top area of the reservoir to the inlet of the anode chamber for conversion, and cools the anode chamber.

20. The method as claimed in claim 14, wherein
a) the method comprises hydrogen being released from a gas mixture containing hydrogen, with this release process being carried out by means of a gas separating process and with the hydrogen released from the gas mixture containing hydrogen being supplied via a connection to a process which maintains hydrogen, and
b) comprises sequestering of carbon dioxide from a gas mixture containing carbon dioxide, which sequestering process is carried out by means of a fuel cell process, and the process extracts carbon dioxide from the gas mixture containing carbon dioxide and, rather than supplying this to the atmosphere, supplies it via a connection to a point which receives and maintains carbon dioxide, while the gas mixture depleted of carbon dioxide is emitted to the atmosphere.

21. The method as claimed in claim 20, wherein the gas separating process for fuel gas and hydrogen is carried out by means of a gas separating installation, and the separating process for carbon dioxide from a gas mixture containing carbon dioxide is carried out by means of a molten carbonate fuel cell and a gas separating installation, which is connected via a connection to the atmosphere, to a synthesis gas source, to a process which receives hydrogen and/or to a process which receives carbon dioxide, and to a point which receives carbon dioxide.

22. The method as claimed in claim 14, wherein the molten carbonate fuel cell and a bioreactor are connected to one another via a connection and the bioreactor contains chemoautotrophic bacteria which are cultivated by supplying them with heat and carbon dioxide, with the carbon dioxide and/or the heat for the growth process of the bacteria being supplied from the molten carbonate fuel cell for this purpose.

23. The method as claimed in claim 14, wherein an anode electrode is coated on an electrolyte matrix, as a substrate, by means of a vapor-deposition or a sputtering process, subdividing the fuel cell area into two chambers in which there are two different pressures, with the higher pressure on the cathode side forcing the process gas through the pores in the electrolyte matrix which, on emerging therefrom, prevents metal vapor from being precipitated in the pore area.

* * * * *